(12) United States Patent
Guerrero-Santos et al.

(10) Patent No.: US 6,376,615 B1
(45) Date of Patent: Apr. 23, 2002

(54) METHOD FOR FUNCTIONALIZING A POLYMER AND PREPARING COPOLYMERS AND TERPOLYMERS

(75) Inventors: Ramiro Guerrero-Santos, Akron, OH (US); Hortensia Maldonado Textle, Division Oceania; Maria Esther De Leon Saenz, Central Zone, both of (MX)

(73) Assignee: Centro de Investigacion en Quimica Aplicada, Saltillo (MX)

( * ) Notice: Subject to any disclaimer, the term of this patent is extended or adjusted under 35 U.S.C. 154(b) by 0 days.

(21) Appl. No.: 09/174,113

(22) Filed: Oct. 16, 1998

(30) Foreign Application Priority Data

Oct. 23, 1997 (MX) .............................. 9708152

(51) Int. Cl.$^7$ .............................. C08C 19/25

(52) U.S. Cl. ................. 525/254; 525/315; 525/244; 525/245; 525/259; 525/258; 525/326.1; 525/331.9; 525/342; 525/370; 525/374; 525/385

(58) Field of Search ................. 525/254, 315, 525/244, 245, 258, 259, 326.1, 331.9, 342, 370, 374, 385

(56) References Cited

U.S. PATENT DOCUMENTS

| | | | | |
|---|---|---|---|---|
| 2,694,692 | A | | 11/1954 | Amos |
| 3,931,355 | A | * | 1/1976 | Rudolph ..................... 525/12 |
| 4,308,354 | A | * | 12/1981 | Lung ........................... 525/84 |
| 4,535,174 | A | | 8/1985 | Crivello ....................... 556/443 |
| 4,581,429 | A | | 4/1986 | Solomon et al. ............ 526/220 |
| 4,777,210 | A | | 10/1988 | Sosa et al. .................... 525/53 |
| 5,043,404 | A | | 8/1991 | Mahabadi et al. ........... 526/194 |
| 5,627,248 | A | * | 5/1997 | Koster .......................... 526/217 |
| 5,721,320 | A | | 2/1998 | Priddy et al. ................ 525/316 |

OTHER PUBLICATIONS

Angier, D.J., et al., "Role of Elastomers in Impact–Resistant Polystyrene," *Rubber Chemistry and Technology*, vol. 38, pp. 1164–1179 (1965).

De León–Sáenz, Esther, et al., "New insights into the mechanism of 1,2–bis (trimethyl–silyloxy)–tetraphenylethane–induced free radical polymerization: application to the synthesis of block and graft copolymers," *Macromol. Chem. Phys.*, vol. 201, No. 1, pp. 1–10 (1999).

K. Matyjaszewski, *Controlled Radical Polymerization*, Ch. 1, "Overview: Fundamentals of Controlled/Living Radical Polymerization", American Chemical Society, ACS Symposium Series 685, pp. 2–30, 1998.

M. Georges, et al., "Narrow Molecular Weight Resins by a Free–Radical Polymerization Process", *Macromolecules*, vol. 26, No. 11, pp. 2987–2988, 1993.

D. Benoit, "Ch. 14, Controlled/Living Free–Radical Polymerization of Styrene and n–Buty Acrylate in the Presence of a Novel Asymmetric Nitroxyl Radical", *American Chemical Society, ACS Symposium Series 685*, pp. 225–235, 1998.

J.S. Wang, et al., "Controlled/'Living' Radical Polymerization. Atom Transfer Radical Polymerization in the Presence of Transition Metal Complexes", *Journal of the American Chemical Society*, vol. 117, No. 20, pp. 5614–5615, 1995.

J.S. Wang, et al., "Controlled/'Living' Radical Polymerization. Halogen Atom Transfer Radical Polymerization Promoted by a Cu(I)/Cu (II) Redox Process", *Macromolcules*, vol. 28, No. 23, pp. 7901–7910, 1995.

K. Matyjaszewski, et al., "Controlled/'Living' Radical Polymerization. Kinetics of the Homogeneous Atom Transfer Radical Polymerization of Styrene," *Journal of the American Chemical Society*, vol. 119, No. 4, pp. 674–680, 1997.

K. Matyjaszewski, et al., "Macromolecular Nomenclature Note No. 12: Naming of Controlled, Living and 'Living' Polymerizations [1]," *Polymer Preprints ACS* 38 (1), pp. 6–9 1997.

K. Matyjaszewski, et al., "'Living' and Controlled Radical Polymerization", *Journal of Physical Organic Chemistry*, vol. 8, pp. 306–315, 1995.

T. Otsu, et al., "Role of Initiator–Transfer Agent–Terminator (Iniferter) in Radical Polymerizations: Polymer Design by Organic Disulfides as Iniferters", *Makromol. Chem., Rapid Commun.*, vol. 3, pp. 127–132, 1982.

T. Otsu, et al., "Living Radical Polymerization Through the Use of Iniferters: Controlled Synthesis of Polymers", *Eur. Polym. J.*, vol. 25, No. 7/8, pp. 643–650, 1989.

(List continued on next page.)

Primary Examiner—Rachel Gorr
(74) *Attorney, Agent, or Firm*—Ladas & Parry

(57) ABSTRACT

The present invention describes the preparation of copolymers grafted by the so-called "grafting from" method, comprising two steps. In the first step, a polymer of a variable type referred to as poly($M_1$) is reacted with persistent free radicals of the type diphenyltrialkylsilyloxymethyl to form a reactive polymer poly($M_1$)$_F$, containing a variable number F of these groups attached to the chain. F represents the average functionality of the reactive polymers and may be predetermined by controlling the ratio of poly($M_1$) and the free radical generator or TPES. In the second step, poly($M_1$)$_F$ is dissolved in a monomer $M_2$ and then redissociated by heating to temperatures of 110–130° C. to produce the macroradical poly($M_1$) and the persistent radicals. The macroradical poly($M_1$) rapidly initiates polymerization whereas the diphenyltrialkylsilyloxymethyl radical stays temporarily on the sideline of the initiation reaction. During the first minutes of the polymerization poly($M_1$)$_F$ is efficiently converted into the grafted copolymer poly($M_1$-graft-$M_2$) while the concentration of the persistent radicals decreases due to secondary reactions. Once all the poly($M_1$)$_F$ has reacted, the conversion of $M_2$ increases due to self-initiation by thermal effects alone. The in situ formation of an appreciable quantity of grafted copolymer results in morphologies of various shapes and nanometric sizes. $M_1$ and $M_2$ include olefin, vinyl, diene monomers, etc.

99 Claims, 3 Drawing Sheets

OTHER PUBLICATIONS

S. Turner, et al., "Photoinitiated Block Copolymer Formation Using Dithiocarbamate Free Radical Chemistry", *Macromolecules*, vol. 23, No. 6, pp. 1856–1859, 1990.

M.V. Baldovi, et al., "Influence of Acids on Reaction Rates of Free Radical Scavenging by Tempo. Relevance to "Living" Free Radical Polymerizations", *Macromolecules*, vol. 29, No. 16, pp. 5497–5499, 1996.

Chernikova E.V., et al., "Living Polymerization Initiated by Hexaphenylethane as a New Iniferter", *Free Radical Polymerization Kinetics and Mechanisms*, pp. 151–154, 1996.

Owen W. Webster, "Living Polymerization Methods", *Science*, vol. 251 pp. 887–892, Feb. 22, 1991.

K. Matyjaszewski, "Introduction to Living Polymerization. Living and/or Controlled Polymerization", *Journal of Physical Organic Chemistry*, vol. 8, pp. 197–207, 1995.

S. Gaynor, et al., "Controlled Radical Polymerization", *J.M.S. —Pure Appl. Chem.*, A31(11), pp. 1561–1578, 1994.

K. Matyjaszewski, "Fundamentals and Practical Aspects of "Living" Radical Polymerization", *Macromolecular Engineering*, pp. 11–24, 1995.

Craig J. Hawker, "Advances in 'Living'Free–Radical Polymerization: Architectural and Structural Control", *Trip*, vol. 4, No. 6, Jun., 1996.

M.K. Georges, et al., "Taming the Free–radical Polymerization Process", *TRIP*, vol. 2, pp. 66–71, Feb. 1994.

N. Listigovers, et al., "Narrow–Polydisperisty Diblock and Triblock Copolymers of Alkyl Acrylates by a "Living" Stable Free Radical Polymerization", *Macromolecules*, vol. 29, No. 27, pp. 8992–8993, 1996.

K. Matyjaszewski, et al., "Controlled/"Living" Radical Polymerization of Styrene and Methyl Methacrylate Catalyzed by Iron Complexes", *Macromolecules*, vol. 30, No. 26, pp. 8161–8164, 1997.

C. Granel, et al., "Controlled Radical Polymerization of Methacrylic Monomers in the Presence of a Bis(ortho–chelated) Arylnickel (II) Complex and Different Activated Alkyl Halides", *Macromolecules*, vol. 29, No. 27, pp. 8576–8582, 1996.

I. Q. Li, et al., "Mono– and Dinitroxide Styrene Polymerization Initators", *Macromolecules*, vol. 29, No. 26, pp. 8554–8555, 1996.

P. Kazmaier, "Nitroxide–Mediated "Living" Free Radical Polymerization: A Rapid Polymerization of (Chloromethyl) styrene for the Preparation of Random, Block, and Segmental Arborescent Polymers", *Macromolecules*, vol. 30, No. 8, pp. 2228–2231, 1997.

S. Jousset, "Kinetic Studies of the Polymerization of p–tert-Butylstyrene and Its Block Copolymerization with Styrene through Living Radical Polymerization Mediated by a Nitroxide Compound", *Macromolecules*, vol. 30, No. 21, pp. 6685–6687, 1997.

T. Fukuda, "Well–Defined Block Copolymers Comprising Styrene–Acrylonitrile Random Copolymer Sequences Synthesized by "Living" Radical Polymerization", *Macromolecules*, vol. 29, No. 8, pp. 3050–3052, 1996.

E. Yoshida, "Synthesis of a Well–Defined Polybromostyrene by Living Radical Polymerization with a Nitroxyl Radical", *Journal of Polymer Science: Part A: Polymer Chemistry*, vol. 34, pp. 2937–2943, 1996.

E. Yoshida, et al., "Synthesis of a Well–Defined Polychlorostyrenes by Living Radical Polymerization with 4–Methoxy–2,2,6,6–Tetramethylpiperidine–1–Oxyl", *Journal of Polymer Science: Part A: Polymer Chemistry*, vol. 35, pp. 2371–2378, 1997.

E. Yoshida, et al., "Living Radical Polymerization of Styrene by a Stable Nitroxyl Radical and Macroazoinitiator", *Macromolecules*, vol. 30, No. 14 pp. 4018–4023, 1997.

C. Hawker, "Molecular Weight Control by a "Living" Free–Radical Polymerization Process", *J. Am. Chem. Soc.*, vol. 116, No. 24, pp. 11185–11186, 1994.

I. Li, et al., "Kinetics of Decomposition of 2,2,6,6–Tetramethyl–1–(1–phenylethoxy) piperdine and Its Implications on Nitroxyl–Mediated Styrene Polymerization", *Macromolecules*, vol. 28, No. 19, pp. 6692–6693, 1995.

G. Moad, et al., "Alkoxyamine–Initiated Living Radical Polymerization: Factors Affecting Alkoxyamine Homolysis Rates", *Macromolecules*, vol. 28, No. 26, pp. 8722–8728, 1995.

C. Hawker, et al., "Accurate Control of Chain Ends by a Novel "Living" Free–Radical Polymerization Process", *Macromolecules*, vol. 28, No. 8, pp. 2993–2995, 1995.

J.D. Druliner, "Living Radical Polymerization Involving Oxygen–Centered Species Attached to Propagating Chain Ends", *Macromolecules*, vol. 24, No. 23, pp. 6079–6082, 1991.

J.D. Druliner, "Polymerization of Acrylates and Methacrylate to Make Homopolmers and Block Copolymers Initiated by N–Alkoxyphthalimides and Succinimides", *Journal of Physical Organic Chemistry*, vol. 8, pp. 316–324, 1995.

A. Kuriyama, et al., "Living Radical Polymerization of Methyl Methacrylate with a Tetrafunctional Photoiniferter: Synthesis of a Star Polymer", *Polymer Journal*, vol. 16, No. 6, pp. 511–514, 1984.

T. Otsu, et al., "Synthesis Reactivity, and Role of 4–Vinylbenzyl N, N–Diethyldithiocarbamate as a Monomer–Iniferter in Radical Polymerization", *Macromolecules*, vol. 19, No. 2, pp. 287–290, 1986.

K. Endo, et al., "Living Radical Polymerization of Styrene with Tetramethylene Disulfide", *Macromolecules*, vol. 25, No. 20, pp. 5554–5556, 1992.

C.R. Nair, et al., "Triblock copolymers via thermal "macroiniferters": Block copolymers of ethyl acrylate with methyl methacrylate or styrene", *Makromol. Chem.*, 192, pp. 579–590, 1991.

R. Guerrero–Santos, et al., "Radical Polymerization of Styrene Initiated by Benzopinacolates: Kinetics and Comments Concerning the Reaction Mechanism", *Eur. Polym. J.*, vol. 30, No. 7, pp. 851–861, 1994.

D. Braun, et al., "Initiation of polymerization with substituted ethanes, 13$^a$), Free radical polymerization of methyl methacrylate and styrene with substituted succinonitriles", *Macromol. Chem. Phys.*, vol. 196, pp. 573–591, 1995.

H. Maldonado–Textle, et al., "Nanodispersion of Polybutadiene in Polystyrene through Controlled "Grafting from" Free Radical Polymerization Using a Diphenylmethyl Type Radical", *Macromolecules*, vol. 31, No. 8, pp. 2697–2698, 1998.

G. Morales, et al., "Synthesis of Graft Copolymers. Part I. Synthesis of Macroinitiators", *Journal of Applied Polymer Science*, vol. 57, pp. 997–1004, 1995.

J.V. Crivello, et al., "Polydimethylsiloxane —Vinyl Block Polymers. I. The Synthesis of Polydimethylsiloxane Macroinitiators Containing Thermolyzable Bis (Silyl Pinacolate) Groups in Their Backbones", *Journal of Polymer Science: Part A Polymer Chemistry*, vol. 24, pp. 1197–1215, 1986.

M.E. DeLeon, et al., "Control of Free–Radical Polymerization of Methyl Methacrylate by a Diphenylethane–Type Initer", *Polymer Preprints ACS* 38(1), pp. 667–668, 1997.

M. Ziebarth, et al., "Die Dissoziation O–silylierter Pinakole, sowie Struktur und Stabilität der entstehenden Ketylradikale $R^1R^2COSiMe_3$", *Liebigs Ann. Chem.*, pp. 1765–1774, 1978.

M.R. Calas, et al. "Chimie Organique —Action de chlorosilanes sur le groupement carbonyl en présence de magnésium; obtention de nouveaux radicaux libres", C.R. Acad. Sc. Paris, vol. 267, pp. 322–325, Jul. 1968 (with English translation, "Reaction of chlorosilanes with carbonyle group in the presence of magnesium. Obtention of new stable free radicals").

K. Doak, Chapter 10, "Styrenic Polymers: History and Technology", pp. 121–151, *Plastic Additives and Modifiers Handbook*, ed. Jesse Edenbaum, published by Van Nostrand Reinhold, New York 1992.

J. Silberberg, et al., "The Effect of Rubber Particle Size on the Mechnical Properties of High–Impact Polystyrene", *Journal of Applied Polymer Science.*, vol. 22, 599–609, 1978.

Ping L. Ku, "Polystyrene and Styrene Copolymers: Their Manufacture and Application. II", Advances in Polymer Technology, vol. 8, No. 3, pp. 201–223, 1988.

Database search on on Jan. 21, 1999 on SciFinder Scholar resulted in a two–page printout with an Abstract for Neumann, et al., "Sterically hindered free radicals. XVII. Addition of diphenylmethyl radicals to radicophilic olefins, and the diastereomer transformation of 2,3–diaryl–2, 3–bis [(trimethylsilyl) oxy]succinonitriles," *Chem. Ber.*, 1986, 119 (11), pp. 3432–3441, and an Abstract for German Patent Document No. DE 2131623 (1972) (both abstracts appear on page 2 of the two–page printout).

* cited by examiner

METHOD FOR FUNCTIONALIZING A POLYMER AND PREPARING COPOLYMERS AND TERPOLYMERS

BACKGROUND

High-impact polystyrene, known by its English acronym HIPS, is a translucent or white opaque material which results from the dispersion of an elastomer phase (usually polybutadiene (PB) with high to low addition content 1,4-cis) in polystyrene (PS). Thanks to the dispersion of quantities of PB varying from 5 to 14% w/w, the material obtained exhibits great impact resistance, which makes it useful for various applications in household electronic devices; in the construction industry; in the packing of foods, goods, and other items; and in other areas. (The percentage mentioned in the preceding sentence represents the percentage of PB in HIPS, wherein the units are weight-by-weight. For instance, "8% w/w" means that each 100 weight units of HIPS contains 8 weight units of PB and 92 weight units of PS.)

The conventional process for preparation of HIPS consists in polymerization of the styrene monomer in the presence of the appropriate quantity of PB. In this process the agitation must be carefully controlled within the conversion range from 10 to 40% w/w, where the discontinuous styrene-polystyrene phase becomes the continuous phase and the PB is dispersed as particles with an average size which varies from 1 to 5 μm. (The percentage in the preceding sentence is the weight-to-weight percentage of styrene that is polymerized.) The particles are composed of partially crosslinked PB with subinclusions of PS and PS grafted to the PB (PB-graft-PS) located in the interfaces. Only a determinated amount of PB of the total amount of PB becomes crosslinked. The immiscibility of PB in PS and the in situ formation of the compatibilizer, PB-graft-PS, give rise to the formation of varied morphologies, for example, of the lamellar, globular, salami type, capsule, foam, and others. These particles are responsible for the absorption of energy when the material is subjected to high intensity (impact) or low intensity (tension) forces, thus avoiding the growth of crazes. (The term "crazes" refers to a multitude of very small cracks which develop to produce failure.)

In contrast to the good impact properties, the dispersion of PB in PS results in materials with reduced optical properties due to the difference in the indices of refraction of the two polymers. This fact translates into the reduction of transparency (opacity) and low luster of the finished products. However, this disadvantage may be reduced if the average particle size is reduced to values less than 1 μm and if the particle-size distribution range is narrowed.

On the other hand, according to reports found in the literature, at a constant concentration of PB, a reduction in particle size results in a gradual increase in the impact resistance due to the increase in the number of particles; however, there is a minimum particle size below which the impact resistance no longer improves or improves minimally. In this respect, the authors seem to be in agreement that the minimum value must be greater than the molecular dimensions, i.e., approximately 0.01 μm. At this minimum size, it is possible to consider that the particles are adequately large to retain the elastomeric properties.

Although, to date there has been only an ambiguous pronouncement concerning the effect of particle size on the impact resistance, it is clear that the two parameters (i.e., particle size and impact resistance) cannot be correlated without taking other factors into account, such as particle-size distribution, morphology, interfacial adhesion, degree of crosslinking of the PB, volume of the PB phases, PB content, size of grafts, and possibly other factors.

Control of these parameters cannot be carried out due to the nonexistence of selective chemical reactions. In effect, the formation of the surface agent (PB-graft-PS), which, to a large measure, determines particle size and interfacial adhesion, cannot be controlled by means of the conventional HIPS preparation process. This is due, on the one hand, to the random nature of the reaction, and, on the other hand, to the lack of understanding of the exact mechanism associated with the grafting reaction and its kinetics. Simply stated, the grafting process, i.e., the process by means of which the PB is gradually converted into PB-graft-PS, may be divided into two steps (see Diagram 1).

Diagram 1

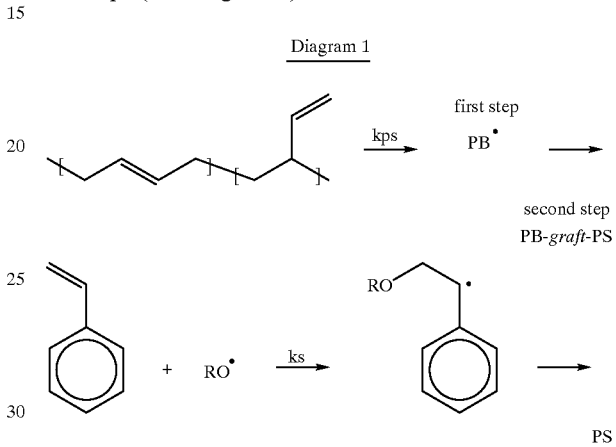

In the first step, the formation of a radical on the PB chain occurs and this is followed by the initiation and propagation reactions of styrene polymerization. The formation of polybutadiene radical PB. in any of its forms (1, 2, 3, 4 below) by abstraction or addition, is the determining factor in the rate of conversion of PB into PB-graft-PS.

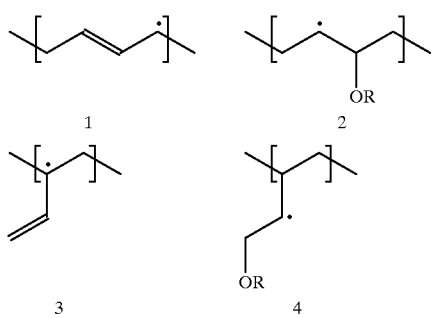

The formation of this grafted copolymer is limited by the low selectively of the primery radicals (RO.) as defined by Equation 1, in which $k_{PB}$ and $k_S$ are the reaction rate constants. [B] and [S] are the the molar concentrations of butadiene and styrene units, respectively. For example, in Equation 1, if [B]/[S] is about 0.1 and $k_S > k_{PB}$, then c<1.

$$C = (k_{PB}/k_S)[B]/[S] \qquad \text{(Equation 1)}$$

SUMMARY

The invention includes a method for functionalizing a polymer, the method comprising reacting the polymer with a free radical of formula A to yield a functionalized polymer, wherein formula A is defined below. The polymer may be selected from the group consisting of polybutadienes with any microstructure, copplymers or terpolymers based on butadiene with any topology and composition, ethhylene-propylene-diene monomers and terpolymers (EPDM) with any topology and composition, polyisoprene or its copolymers with any topology and composition, polychloroprenes or copolymers of chloroprene with any topology and composition, polyvinyl chlorides or copolymers of vinyl chlorides, natural rubber regardless of its origin, alkyl polymethacrylates, alkyl polyacrylates, polyacetylenes, polyacrylonitriles, polyvinyl acetates, and mixtures thereof. (The term "composition" is well-known in the art to refer to the molar relation of monomers comprising the copolymer or terpolymer.) Other polymers are set forth below in the "Description" section.

The invention also includes a method for preparing a copolymer or terpolymer, the method comprising initiating polymerization of a monomer or a mixture of monomers with a modified polymer to yield the copolymer or terpolymer, wherein the copolymer or terpolymer comprises two or more monomers.

DESCRIPTION

Figure 1:
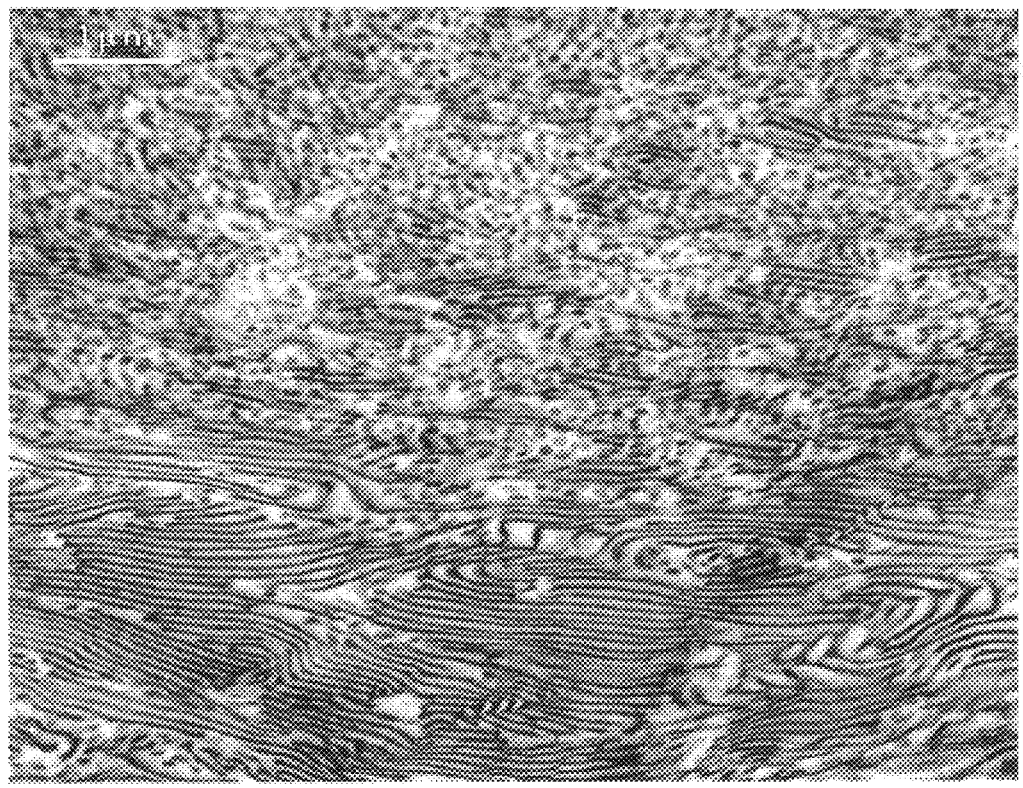
FIG. 1 is a TEM (Transmission Electron Microscopy) micrography of an ultrathin section of HIPS prepared according to Example 1, wherein the section was obtained by cryogenic ultramicrotomy of cast films and stained with $OsO_4$.
Figure 1:
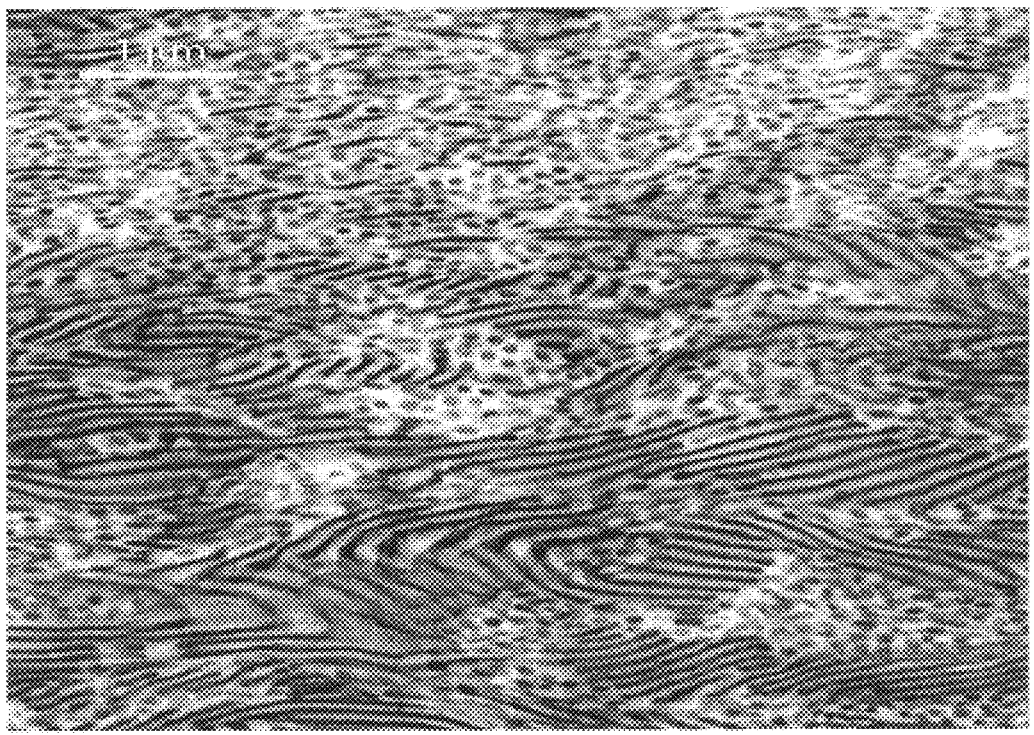

The present invention describes a method for the dispersion of saturated or unsaturated polymers such as elastomers, thermoplastics, or thermosets regardless of their form (linear or branched) having labile substituents (i.e. including but not necessarily limited to, allyl protons (H), tertiary protons (H), protons belonging to chemical groups (e.g., amide, acetal, urethane, urea, etc.), halogens (e.g., Cl, Br, I, and F)) and/or double-bond polymers (including, but not necessarily limited to, polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes) in polymers formed of monomers or monomer combinations which are susceptible to free-radical polymerization (specific monomers or comonomers including, but not necessarily limited to, styrene, methyl methacrylate, ethyl methacrylate, propylmethacrylate, (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methylacrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, functional methacrylates, acrylates and styrenes selected from, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hyroxybutyl acrylate (all isomers), N,N-diethylaminoethyl acrylate, triethyleneglycol acrylate, methacrylamide, N-methylacrylamide, N,N-dimethyl acrlyamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), alpha-methylvinyl benzoic acid (all isomers), diethylamino alpha-methylstyrene (all isomers), p-vinylbenzene sulfonic acid, p-p-vinylbenzene sulfonic acid sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropylmethoxysilylpropyl methacrylate, dimethoxysilylpropyl methacrylate, diethoxysilylpropyl methacrylate, dibutoxysilylpropyl methacrylate, diisopropoxylsilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropyl-methoxysilylpropyl acrylate,dimethoxysilylpropyl acrylate, diethoxysilylpropyl acrylate, dibutoxysilylpropyl acrylate, diisopropoxylsilylpropyl acrylate vinyl acetate, vinyl butyrate, vinylbenzoate, vinyl chloride, vinyl fluoride, vinyl bromide, maleic anhydride, N-phenylmaleimide, N-vinylpyrrolidone, N-vinylcarbazole, butadiene, isoprene, chloroprene, ethylene, propylene, p-amino styrene. The product produced by the above-described method is a copolymer or terpolymer comprising two or more monomers. For example, the product may be, but is not necessarily limited to, HIPS and HIPS-like materials; methylmethacrylate-butadiene-styrene resins (MBS), which are a dispersion of polybutadiene in a copolymer composed of methylmethacrylate and styrene, and MBS-like materials; and acrylonitrile-butadiene-styrene resins (ABS), which are a dispersion of polybutadiene in a copolymer composed of acrylonitrile and styrene, and ABS-like materials. Said method ameliorates the problem associated with the low selectivity of the grafting reaction in the conventional preparation of HIPS previously mentioned.

The present method, which involves the preparation of copolymers grafted by the so-called "grafting from" method, comprises two steps. In the first step, a polymer of a variable type referred to as "poly($M_1$)" is reacted with persistent free radicals FR of formula A, which is described in detail below, to form a reactive polymer poly($M_1$)$_F$ containing a variable number F of these FR groups attached to the chain. F represents the average functionality of the reactive polymers and may be predetermined by controlling the ratio of poly ($M_1$) and the free radical generator (TPES), which is described in detail below and which yields the persistent free radicals FR of formula A. Thus, in the first step, a polymer listed above (e.g., polymers such as elastomers, thermoplastics, or thermosets regardless of their form (linear or branched) having labile substituents (i.e. including but not necessarily limited to, allyl protons (H), tertiary protons (H), protons belonging to chemical groups (such as amide, acetal, urethane, urea, etc.), halogens (such as Cl, Br, I, and F)) and/or double-bond polymers (including, but not necessarily limited to, polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes)) is functionalized to yield poly $(M_1)_F$.

In the second step, poly($M_1$)$_F$, which was prepared in step 1, is dissolved in a monomer $M_2$ and then is redissociated by heating to temperatures of about 80–160° C. (or preferably about 80–140° C., or most preferably about 80–130° C.) to produce the macroradical poly($M_1$). and the persistent free radicals FR of formula A. The macroradical poly($M_1$). is believed to rapidly initiate polymerization, whereas the persistent free radical FR is believed to stay temporarily on the sideline of the initiation reaction. During the first minutes of the polymerization, poly($M_1$)$_F$ is believed to be efficiently converted into the grafted copolymer poly($M_1$-graft-$M_2$), while the concentration of the persistent FR radicals is believed to decrease due to secondary reactions. These secondary reactions include, but are not necessarily limited to: (a) initiation of polymer chains by the persistent free radical FR; (b) quinonic termination between the persistent free radical FR and a growing chain; and (c) termination by disproportionation. Once all of the poly($M_1$)$_F$ has reacted, the conversion of $M_2$ is believed to increase due to self-initiation by thermal effects alone. The in situ formation of an appreciable quantity of grafted copolymer results in morphologies of various shapes and nanometric sizes. $M_1$ and $M_2$ can include, but are not necessarily limited to, olefin, vinyl, and diene monomers, and the like. $M_2$ can also include, but is not necessarily limited to, condensation monomers and the like.

Thus, in the second step, grafted copolymers (i.e., poly($M_1$-graft-$M_2$)) are produced when one or more of the modified (i.e., functionalized) polymers listed above are used as initiators of the polymerization of one or a mixture of several vinyl, olefin, or diene monomers or condensation monomers. Such monomers include styrene, methyl methacrylate, ethyl methacrylate, propylmethacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methylacrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrilonitrile, functional methacrylates, acrylates and stryenes selected from glycidyl methacrylate, 2-hydroxyethyl methacrylate, hydroxypropyl methacrylate (all isomers), hydroxybutyl methacrylate (all isomers), N-N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hyroxybutyl acrylate (all isomers), N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, n-ethylolmethacrylamide, N-tert-butylacrylamide, N-n-butylacrylamide, n-methylolacrylamide, N-ethylolacrylamide, vinyl benzoic acid (all isomers), diethylaminostyrene (all isomers), alpha-methylvinyl benzoic acid (all isomers), diethylamino alpha-methylstyrene (all isomers), p-vinylbenzene sulfonic acid, p-p-vinylbenzene sulfonic acid sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropyl-methoxysilylpropyl methacrylate, dimethoxysilylpropyl methacrylate, diethoxysilylpropyl methacrylate, dibutoxysilylpropyl methacrylate, diisopropoxylsilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilypropyl acrylate, dibutoxymethylsilylpropyl acrylate, diisopropyl-methoxysilylpropyl acrylate, dimethoxysilylpropyl acrylate, diethoxysilylpropyl acrylate, dibutoxysilylpropylacrylate, diisopropoxylsilylpropyl acrylate, vinyl acetate, vinyl butyrate, vinylbenzoate, vinyl chloride, vinyl fluoride, vinyl bromide, maleic anhydride, N-phenylmaleimide, N-vinylpyrrolidone, N-vinylcarbazole, and p-amino styrene, wherein all of the preceding monomers listed in this sentence may be considered vinyl monomers; diene monomers (e.g., butadiene, isoprene, and chloroprene); and olefinic monomers (e.g., ethylene and propylene). The poly($M_1$)$_F$ can be characterized by physicochemical methods; and its functionality F can be adjusted accordingly with the ratio of reactants in step one. Thus, by increasing F, the extend of the grafting reaction can be enhanced. (Physicochemical methods can include, but are not necessarily limited to: spectroscopic and chromatographic techniques such as size exclusion chromatography, nuclear magnetic resonance, elemental analysis, infrared or UV spectrometry, etc. The phrase "extend of the grafting reaction" means how much PB is transformed into graft copolymer.) In other words, the formation of grafted copolymers enables stabilization of extremely fine dispersions, such as those found in the examples that are set forth below. Due to the extremely fine distribution of the preformed functional polymer in the newly formed matrix, the resultant materials may be considered as nanocomposites. "Preformed functional polymer" refers to poly($M_1$); and "newly formed matrix" refers to poly($M_2$).

In contrast with the conventional method presented in Diagram 1, the method described in the present invention is based on the formation of thermodissociable bonds between the polymer described above (e.g., polymers such as elastomers, thermoplastics or thermosets regardless of their form (linear or branched) having labile substituents (i.e. including but not necessarily limited to, allyl protons (H), tertiary protons (H), protons belonging to chemical groups (e.g., amide, acetal, urethane, urea, etc.), halogens (e.g., Cl, Br, I, and F)) and/or double-bond polymers (including, but not necessarily limited to, polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes)) and the persistent free radicals (herein referred to as "FR") of the type triphenylmethyl or diphenylmethyl of formula A including, but not necessarily limited to, substituted or unsubstituted diphenylacetonitryl, substituted or unsubstituted diphenylphenyloxymethyl, substituted or unsubstituted triphenylmethyl, substituted or unsubstituted diphenyltrialkylgermaniumyloxymethyl, and most preferably substituted or unsubstituted diphenyltrialkylsilyloxymethyl. (In the formulas following formula A, the term "A" or "A." is used to identify these radicals.) These radicals are generated from dimers of the persistent free radicals FR of formula A. (The preparation of these radicals has been disclosed in *Comptes Rendues de la Academie des Sciences*, Paris 267, (1968) by R. Calas, N. Duffaut, C. Biran, P. Bourgeois, F. Piscotti, and J. Dunoges.) These dimers (see formula B) are referred to in the present invention as "tetraphenylethane substituted" compounds or TPES, which is an acronym that is used herein to refer to any and all dimers of the persistent free radicals FR of formula A.

Formula A

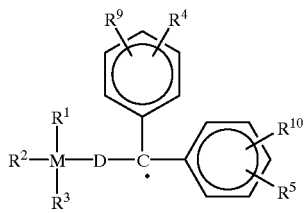

Formula B

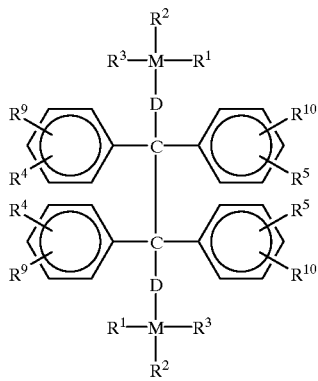

The persistent free radicals FR are represented by formula A, and the dimers are represented by formulas B, H (see below), and K (see below):

wherein $R^1$, $R^2$, and $R^3$ are the same or different and are each independently selected from the group consisting of R;

wherein M is a silicon or germanium atom;

wherein

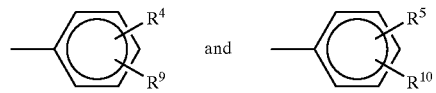

are the same or different radicals which are each independently selected from among aromatic cyclic hydrocarbons, wherein the aromatic cyclic hydrocarbons may contain one or more (up to three) heteroatoms (e.g., including, but not necessarily limited to, nitrogen) in the ortho, meta, and/or para positions and/or may have one, two, or up to five substituents (with the substituents being selected from the group consisting of, but not necessarily limited to, halogens (e.g., including, but not necessarily limited to, Br, Cl, I, and F), —$NO_2$, —OR (alkoxy), R, and —OH (hydroxy)) at the ortho, meta and/or para positions (preferably if there are five substituents, all five substituents are halogens), and wherein when the phenayl moieties of the radicals

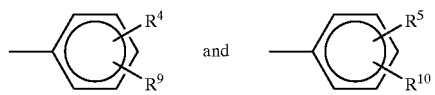

are directly linked to the same carbon atom, the radicals

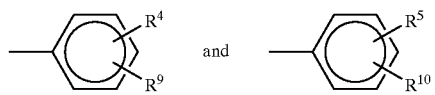

may form divalent diaryl groups selected from among:

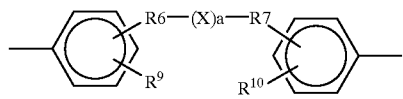

wherein $R^6$ and $R^7$ are the same or different and are each independently selected from the group consisting of multivalent substituted $C_{6-13}$ cyclic aromatic hydrocarbons (aryl groups), non-substituted $C_{6-13}$ cyclic aromatic hydrocarbons (aryl groups), substituted $C_{6-13}$ linear or branched hydrocarbons (aliphatic groups), and non-substituted $C_{6-13}$ linear or branched hydrocarbons (aliphatic groups), wherein a is 0 or 1, and wherein X is selected from the group consisting of —O—, —S—, —$CH_2$— and

and wherein D is oxygen or

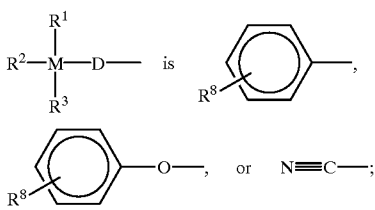

wherein $R^4$, $R^5$, $R^8$, $R^9$, and $R^{10}$ are the same or different and are each independently selected from the group consisting of H, halogens (e.g., including, but not necessarily limited to, Br, Cl, I, and F), —$NO_2$, —OR (alkoxy), R, and —OH (hydroxy);

wherein $R^1$, $R^2$, and $R^3$ are the same or different and are each independently selected from the group consisting of H, —OR (alkoxy), and R; and wherein each R is independently selected from the monovalent groups consisting of:

$C_{1-13}$ linear or branched hydrocarbons, which may be substituted or unsubstituted, $C_{3-13}$ substituted or non-substituted cyclic hydrocarbons, $C_{6-13}$ substituted or non-substituted cyclic aromatic hydrocarbons, and $C_{6-13}$ substituted or non-substituted cyclic aromatic hydrocarbons containing heteroatoms.

In formula B, the atoms of silicon or germanium of different TPES groups may be linked by means of groups selected from R to form oligomers whose degree of polymerization is between 2 and 100.

Examples of TPES dimers include, but are not necessarily limited to, 1,1,2,2-tetraphenyl-bis(trimethylsilyloxy)ethane (see formula C); 1,1,2,2-tetra(pentafluorophenyl)-bis(trimethylsilyloxy)ethane (see formula D); 1,2-di(2-fluorophenyl)-1,2-diphenyl-bis(trimethylsilyloxy)ethane (see formula E); 1,1,2,2-tetra(4-fluorophenyl)-bis(trimethylsilyloxy)ethane (see formula F); oligo[1,1,2,2-tetraphenyl-bis(trimethylsilyloxy)ethane] (see formula G, wherein "n" represents the degree of polymerization); dimethyl-bis(diphenylmethoxy)silane (see formula H); bis(fluorenyltrimethylsilyloxy) (see formula I); 1,2-di(4-methylphenyl)-1,2-diphenyl-bis(trimethylsilyloxy)ethane (see formula J); tetradiphenylmethoxysilane (see formula K); 1,2-di(4-methoxyphenyl)-1,2-diphenyl-bis(trimethylsilyloxy)ethane (see formula L); 1,1,2,2-tetraphenyl-bis(dimethylphenylsilyloxy)ethane (see formula M); 1,2-di(2-pyridyl)-1,2-bis(trimethylsilyloxy)ethane (see formula N); bis(benzanthronetrimethylsilyloxy) (see formula O); and bis(xanthonetrimethylsilyloxy) (see formula P). Formulas C through P are set forth below.

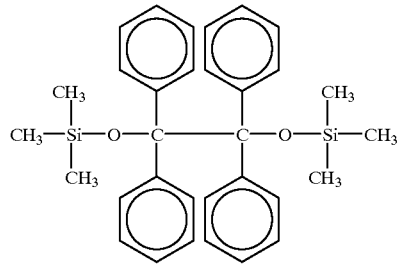

Formula C

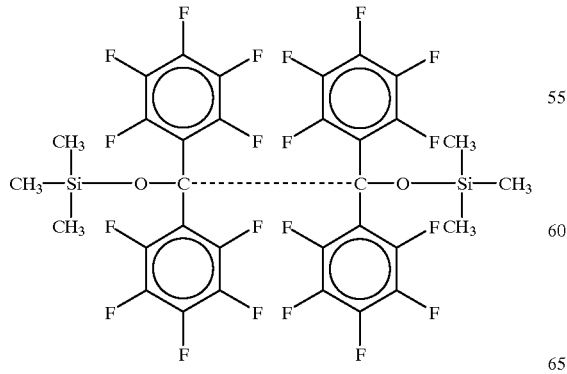

Formula D

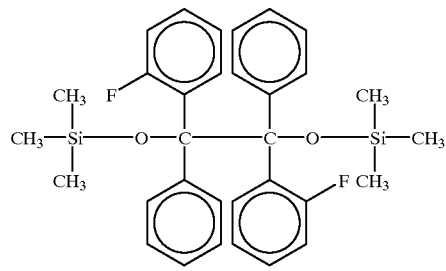

Formula E

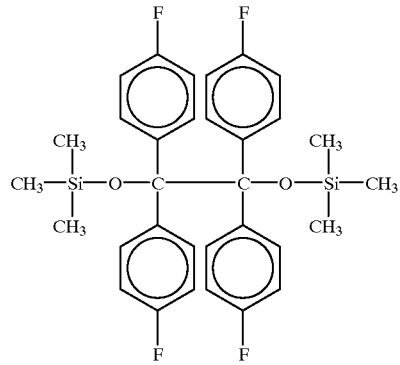

Formula F

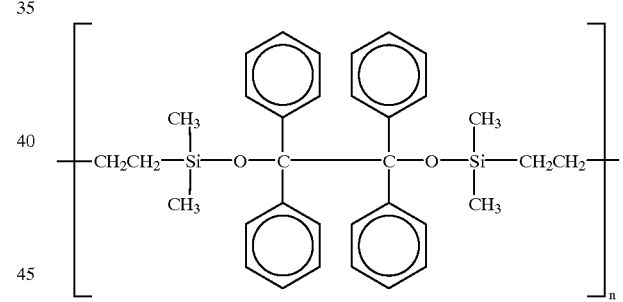

Formula G

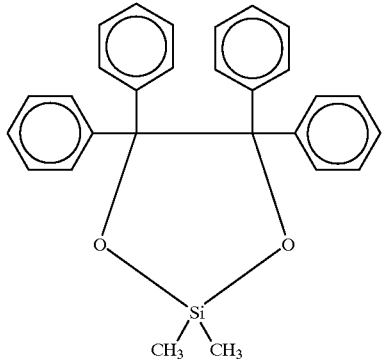

Formula H

Formula I
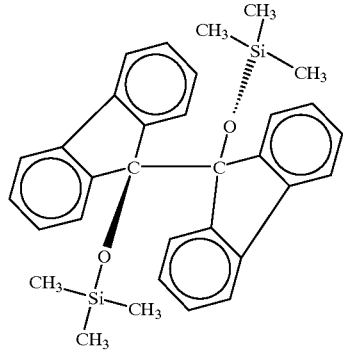
Formula J
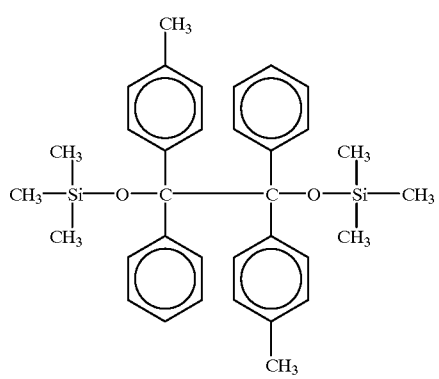
Formula K
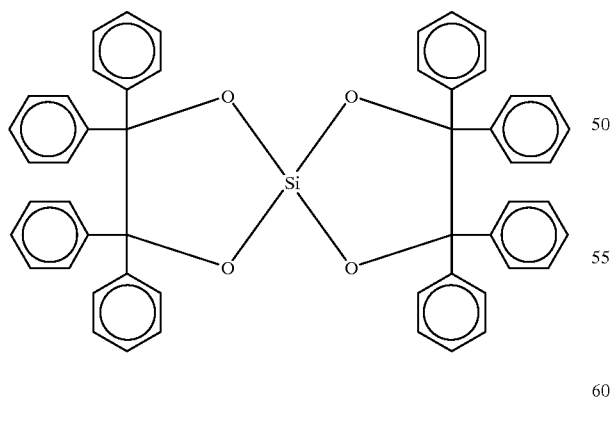
Formula L
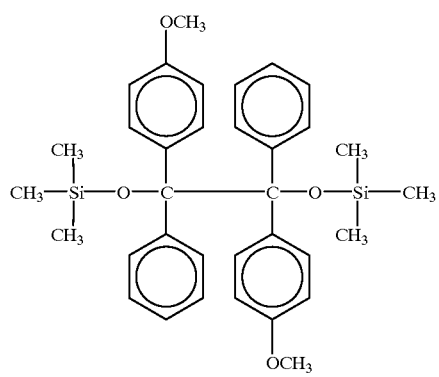
Formula M
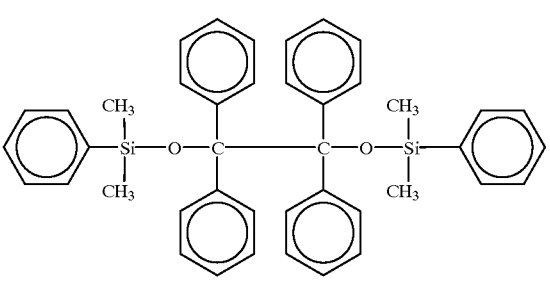
Formula N
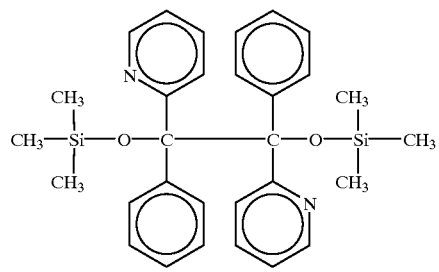
Formula O
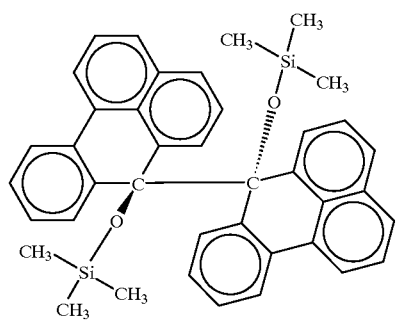

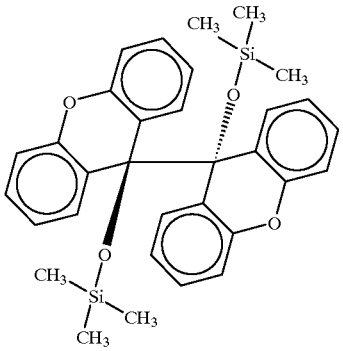

Formula P

Thermodissociable bonds between the above-described polymers (e.g., polymers such as elastomers, thermoplastics, or thermosets regardless of their form (linear or branched) having labile substituents (i.e. including but not necessarily limited to, allyl protons (H), tertiary protons (H), protons belonging to chemical groups (e.g., amide, acetal, urethane, urea, etc.), halogens (e.g., Cl, Br, I, and F)) and/or double-bond polymers (including, but not necessarily limited to, polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes)) and persistent free radicals FR of formula A are formed by heating to a boil a sample of the above-described polymer and the appropriate TPES free radical generator/dimer (preferably less than approximately 40 moles but more than 0 moles of the monomer units in the polymer for each mole of TPES, more preferably less than approximately 200 moles and more than 0 moles of the monomer units in the polymer for each mole of TPES, and most preferably less than approximately 400 moles and more than 0 moles of the monomer units in the polymer for each mole of TPES), with both being dissolved in an appropriate solvent, which forms the reaction medium. The heating referred to in the preceding sentence is to a temperature around the boiling point of the solvent being used (e.g., the temperature may be approximately equal to the boiling point of the solvent plus or minus 20° C., or the boiling point of the solvent plus or minus 10° C., or the boiling point of the solvent plus or minus 5° C., or the boiling point of the solvent plus or minus 2.5° C.). An "appropriate solvent" refers to those solvents not giving significant reactions with persistent free radicals FR of formula A, solvents apt to dissolve simultaneously the polymer (elastomer) and TPES, and solvents boiling in the range of approximately 75–180° C. Appropriate solvents include, but are not necessarily limited to, organic solvents such as toluene, benzene, hexane, cyclohexane, 1,2-dichloroethane, halogenated cyclic aromatic hydrocarbons, heptane, and other organic solvents.

For example, when 1,1,2,2-tetraphenyl-bis (trimethylsilyloxy) ethane (TPES dimer of formula B, where M=Si, $R_1=R_2=R_3=CH_3$, and $R_4=R_5=H$) is dissolved in toluene containing the above-described polymer (e.g., polybutadiene or any of the other above-described polymers) and heated to reflux, a pink coloration characteristic of the persistent free radical FR of formula A is produced. The coloration disappears slowly over a period of approximately 1 to 3 hours due to the addition of persistent free radicals FR of formula A at the various reactive sites of the polymer (e.g., PB or any of the other above-described polymers). These sites include, but are not necessarily limited to, the olefin double bonds (addition 1,4 cis and trans) and vinyl (addition 1,2) double bonds as well as the allyl protons. For polymers such as polyisoprene and chloroprene, these sites may also include, but are not necessarily limited to, the vinyl (addition 3,4) double bonds. After this reaction, the monomeric units of the polymer (e.g., PB) may present one or several of the following structures:

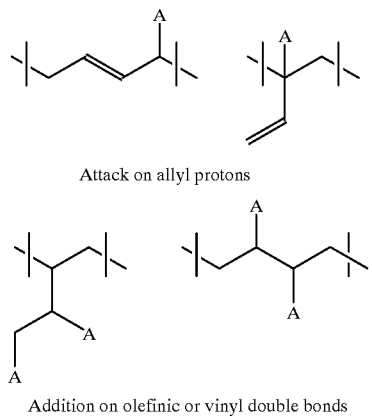

Attack on allyl protons

Addition on olefinic or vinyl double bonds

The reaction medium may contain radical transposition subproducts because of the interaction between persistent free radicals FR of formula A and polymer radicals. Some other subproducts may arise from the reaction of persistent free radicals FR of formula A and the additives typically added to stabilize polymers. In addition, some secondary reactions occur that result in the formation of small quantities of crosslinked polymer (e.g., elastomer). In order to enhance the efficiency of persistent free radicals FR of formula A during the polymer (e.g., elastomer) modification, small amounts of polar compounds (including, but not necessarily limited to, vinyl acetate, maleic anhydride, water, vinyl ethers, isopropenylacetate, and other monomers that are unreactive towards the addition of FR free radicals of formula A and the like) optionally can be added to the medium. The polarity of the polar compounds may approximately equal or exceed the polarity of any of the specific compounds set forth in the parenthetical portion of the preceding sentence.

The polymers (e.g., polymers such as elastomers, thermoplastics, or thermosets regardless of their form (linear or branched) having labile substituents (i.e. including but not necessarily limited to, allyl protons (H), tertiary protons (H), protons belonging to chemical groups (e.g., amide, acetal, urethane, urea, etc.), halogens (e.g., Cl, Br, I, and F)) and/or double-bond polymers (including, but not necessarily limited to, polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes)) thus modified may be separated by precipitation; and their functionality may be easily determined by means of $^1$H NMR by comparison of the area of the peaks corresponding to the chemical groups (e.g., $Si(R^{1-3})$ or $Ge(R^{1-3})$) of the modified polymers and the area of the peaks corresponding to the main chain. The efficiency (E) of the radical-generating compounds is determined by Equation 2.

$$E = 100[TPES]_f / [TPES]_i \quad \text{(Equation 2)}$$

where $[TPES]_i$ is the quantity (number of moles) of TPES used to modify the polymer; and $[TPES]_f$ is the quantity (number of moles) of TPES actually linked to the polymer. Thus, E is a mole-by-mole percentage. In the case of TPES, E is on the order of 10 percent when the elastomer is PB. Taking this value into consideration, the average functionality (F) may be predetermined by using the average molecular weight $\overline{M}_n$ (i.e., the number-average molecular weight of the polymer) for it. The specific formula used-to calculate the functionality is: $F = (2E \cdot Dpn)[TPES]_i/[BD]_i$; wherein $[TPES]_i$ and $[BD]_i$ represent the initial molar concentration of, respectively, TPES and butadiene units in the reaction; wherein E represents the efficiency: and wherein Dpn is the number-average degree of polymerization (easily calculated from Mn).

Once the polymer (e.g., polymers such as elastomers, thermoplastics, or thermosets regardless of their form (linear or branched) having labile substituents (i.e. including but not necessarily limited to, allyl protons (H), tertiary protons (H), protons belonging to chemical groups (e.g., amide, acetal, urethane, urea, etc.), halogens (e.g., Cl, Br, I, and F)) and/or double-bond polymers (including, but not necessarily limited to, polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes)) has been modified as described above, it may be stored for about a week; and the storage time may be extended if the polymer is stored at a low temperature (e.g., typically lower than about −18° C. and higher than about −80° C.) and protected from light. Long storage periods result in crosslinking of the modified polymers due to the absence of stabilizers.

For the preparation of the dispersions, the modified polymers (e.g., polymers such as elastomers, thermoplastics, or thermosets regardless of their form (linear or branched) having labile substituents (i.e. including but not necessarily limited to, allyl protons (H), tertiary protons (H), protons belonging to chemical groups (e.g., amide, acetal, urethane, urea, etc.), halogens (e.g., Cl, Br, I, and F)) and/or double-bond polymers (including, but not necessarily limited to, polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes)) are redissolved in styrene (or any of the above-described vinyl, olefin, or diene monomers or condensation monomers), which preferably may be oxygen-free and/or distilled, and heated to temperatures higher than about 80° C. (preferably 80–160° C., more preferably 80–135° C., and most preferably 80–130° C.).

In the step set forth in the preceding paragraph, there are preferably less than approximately 45 parts by weight and more than 0 part by weight of functional polymer; more preferably, there are less than approximately 20 parts by weight and more than 0 part by weight of functional polymer; and most preferably, there are less than approximately 15 parts by weight and more than 0 part by weight of functional polymer. In all three cases mentioned in the preceding sentence, monomer or a mixture of two or more monomers is added to complete 100 parts. Alternatively, in the step set forth in the preceding paragraph, preferably there are approximately 0.01–35 (or less than approximately 35) parts by weight of polymer and approximately 65–99.99 (or between approximately 65 and 100) parts by weight of monomer; or preferably there are approximately 0.01–20 (or less than approximately 20) parts by weight of polymer and approximately 80–99.99 (or between approximately 80 and 100) parts by weight of monomer; or preferably there are approximately 0.01–15 (or less than approximately 15) parts by weight of polymer and approximately 85–99.99 (or between approximately 85 and 100) parts by weight of monomer. This treatment causes homolytic dissociation of the previously formed bonds between the polymer such as PB and the persistent free radicals FR of formula A to regenerate a macroradical such as PB. (see Diagram 2 below, wherein "St" represents styrene), which initiates the polymerization of styrene (or any of the above-described vinyl, olefin, or diene monomers, or condensation monomers) in a "grafting from" reaction. The term "grafting from" describes the initiation and growing of a grafted chain from the backbone. An additional advantage is that, at the temperature indicated above, the persistent free radical of formula A has difficulty initiating the polymerization of styrene (of the polymerization of any of the above-described vinyl, olefin or diene monomers, or condensation monomers) and acts primarily as a chain-growth moderator by means of a reversible termination reaction with the growing chains. In effect, it has been demonstrated that this persistent free radicals FR of formula A has the characteristic of moderating the length of growing chains operating as a reversible termination agent through a process known as controlled/"living" free-radical polymerization as disclosed in Controlled Radical Polymerization (ISBN 0-8412-3545-7), ACS Symposium Series 685 (1998) by K. Matyjaszeski. (The term "controlled free-radical polymerization," which is also discussed by Matyjaszewski and Mullen in Polymer Preprints ACS, 38 (1) p. 6–8 (1997), is used to describe those free-radical polymerizations characterized by a quasi chemoselectivity propagation reaction provided by the reversible deactivation of the growing sites through stable or persistent free radicals.) However, the effect of the persistent free radicals FR of type A has been observed only at low conversions, as discussed in Polymer Preprints ACS, 38(1) 667–668 (1997) by De Leon, M. E., Gnanou, Y., and Guerrero, R. (The term "low conversions" may refer to conversions lower than about 20% w/w. "Conversion" refers to the amount of styrene (or any of the above-described vinyl, olefin, or diene monomers, or condensation monomers) converted into polystyrene (or a grafted copolymer of any of the above-described vinyl, olefin, or diene monomers, or condensation monomers). In this case, polystyrene is part of a graft copolymer. In fact, the progressive loss of the "controlled" behavior is due to the slow initiation of the styrene polymerization by the persistent free radicals FR itself, which results in the formation of homopolystyrene and the early extinction of the polymerization under controlled regime. As a matter of fact, the formation of homopolystyrene confirms that the persistent free radicals FR are not completely inert towards the double bond addition.

Under the foregoing scheme, the formation of grafted copolymers (e.g., PB-graft-PS) occurs efficiently at low conversion values (e.g., conversions greater than about 0% w/w and less than approximately 40% w/w, or more preferably less than approximately 20% w/w, or most preferably less than about 10% w/w; or "low conversions" may refer to conversions of approximately 10–20% w/w or conversions of approximately 20–40% w/w). Once the formation of grafts has occurred, the conversion may be completed to approximately 100% either by means of autopolymerization (the effect of temperature) or by the effect of a conventional free-radical generator or an exhaustor such as a high-temperature peroxide compound (e.g., cumyl peroxide, t-butyl peroxide, t-butyl hydroperoxide, and other peroxides, including other peroxides having half-life times above approximately 7 minutes at approximately 100° C.). For styrene, autopolymerization occurs by the effect of the temperature at a rate of approximately 14 percent/hr. at approximately 127° C. and at a rate of approximately 9 percent/hr. at approximately 110° C.

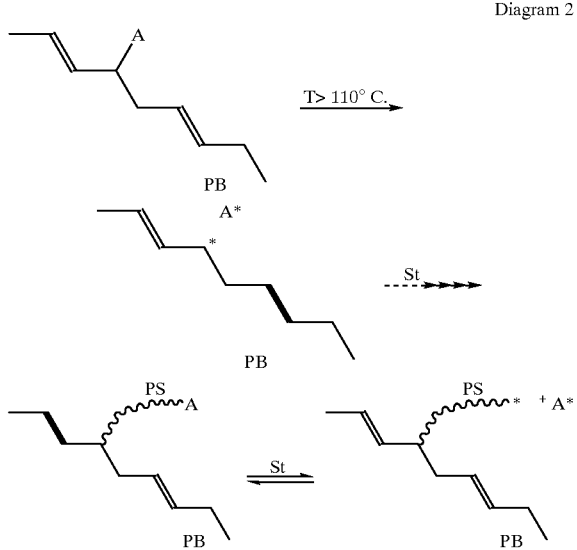

Diagram 2

Compared with the conventional preparation methods, the chains of the above-described polymer (e.g., polymers such as elastomers, thermoplastics, or thermosets regardless of their form (linear or branched) having labile substituents (i.e. including but not necessarily limited to, allyl protons (H), tertiary protons (H), protons belonging to chemical groups (e.g., amide, acetal, urethane, urea, etc.), halogens (e.g., Cl, Br, I, and F)) and/or double-bond polymers (including, but not necessarily limited to, polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes)) are grafted with greater control by the preparation method of the present invention and do not appear to depend on the capacity of the initiator to attack the polymer chain, unlike the conventional method shown in Diagram 1. In effect, in this new method, it is possible to exert a better control over both the formation of macroradicals (poly($M_1$) in the first step and the "grafting from" reaction of styrene (or any of the above-described vinyl, olefin or diene monomers, or condensation monomers) in the second step.

EXAMPLE 1

Approximately 12 grams of polybutadiene having an average molecular weight of about $\overline{M}_n=153{,}000$ g/mol (Buna/Bayer) and approximately 150 ml of distilled toluene were placed in a 500-ml two-neck flask equipped with a magnetic agitator, a condenser, and an argon inlet. Once the polybutadiene was dissolved, approximately 0.8625 grams of TPES (where M=Si, $R_1=R_2=R_3=CH_3$, and $R_4=R_5=H$) were added, with agitation continuing until the mixture was homogenized. Then, the mixture was heated to boiling and kept in reflux for about 3 hours. At the end of this time, the disappearance of the pink coloration caused by the presence of the persistent free radicals FR of formula A was observed, and the reaction was stopped by decreasing the temperature to the ambient temperature (in this application, the term "ambient temperature" means a temperature of about 20–25° C.). The modified polymer solution thus obtained was transferred to a 400-ml jacketed aluminum reactor with a conical bottom to which approximately 70 ml of distilled styrene was added. The mixture was homogenized by means of magnetic agitation. The temperature was raised to approximately 130° C.; and after approximately 13 hours of heating, the reaction was stopped by cooling the reactor. When the solution reached approximately the ambient temperature, the copolymer was recovered by precipitation in an excess of methanol. The styrene conversion was calculated as approximately 45.3% based on the data obtained by gravimetry. The percentage of gel obtained by the centrifugation method was approximately 27%, which is the percent w/w of nonsoluble (cross-linked) HIPS. The average molecular weight $\overline{M}_n$ of the soluble part obtained by SEC (Size Exclusion Chromatography) was approximately 102,000 g/mol. The obtained product represents HIPS, which was composed of graft copolymer, as well as PB and PS. Herein, HIPS was composed of approximately 27 percent w/w of an insoluble part (gel) and approximately 73 percent w/w of a soluble part (no gel). The transmittance of an approximately 0.31-mm-thick film obtained by solvent evaporation and measured by UW was approximately 10%.

This film was obtained by evaporation of a solution containing approximately 10 percent w/w of HIPS in toluene (casting).

The micrographs of 100-nm-thick sections (made from the soluble part) obtained by cryogenic microtomy and stained with $OSO_4$ show extremely fine particles with an average diameter of about 70 nm coexisting with a lamellar structure probably formed during a thermal treatment of the samples during drying (i.e., heating to about 115° C. for about 24 hours). It is also possible to observe the homogeneous spatial distribution of the particles and the apparent absence of polystyrene subinclusions (see, for example, FIG. 1).

EXAMPLE 2

Approximately 100 grams of polybutadiene having an average molecular weight of about $\overline{M}_n$=155,000 g/mol (Buna/Bayer) and approximately 8.2 grams of TPES (where M=Si, $R_1$=$R_2$=$R_3$=$CH_3$, and $R_4$=$R_5$=H) and approximately 1 liter of toluene were placed in a 2-liter two-neck flask equipped with a magnetic agitator, a condenser, and an argon inlet. The solution was heated to boiling and kept in reflux for about 3 hours, the time at which a fading of the pink coloration caused by the persistent free radicals FR of formula A was observed. When the solution no longer presented this color, the heat was removed; and the polymer was recovered by precipitation in an excess of methanol, was filtered, and was dried under a vacuum. The weight of polymer thus obtained was approximately 90 grams. The values of E and F, which are defined above, were determined to be 8.36% and 3.4, respectively. (The functionality F, which represents the average number of radicals of formula A bonded to each PB chain, is a dimensional amount known in the art.) In a second step, approximately 84 grams of the modified polybutadiene and approximately 956 grams of recently distilled styrene were placed in a 1-gallon stainless steel flat-bottom Parr reactor provided with an anchor type agitator and a turbine. The solution was bubbled with nitrogen for several hours to reduce or eliminate the dissolved oxygen; and the temperature of the reactor was raised to approximately 120° C., while a constant agitation of about 100 rpm was maintained. At the end of about 30 minutes of reaction, the styrene conversion reached a value of approximately 25%. At that time, the temperature of the reactor was lowered to ambient temperature; and the reactor was charged with two liters of aqueous solution. Said solution was made up of about 2 liters of water, about 1.4 grams of partially hydrolyzed polyvinyl alcohol, about 1.6 grams of sodium chloride, and about 0.4 grams of nonylphenol. The reactor was closed again, saturated with nitrogen, heated to approximately 130° C. for about 6 hours, then heated to approximately 150° C. for about two additional hours, and then cooled. In the suspension step, agitation was maintained at about 500 rpm. When this treatment was completed, the temperature was raised to about the ambient temperature; and the reactor was opened to collect approximately 950 grams of translucent white beads of approximately uniform size. These beads were filtered, washed, and dried. Approximately 5 grams of said beads were dissolved in toluene to determine the percentage of gel by centrifugation, of which the value was about 28%. (The "percentage of gel by centrifugation," which is calculated from the gravimetrical data, is the ratio of the insoluble part and the total amount of sample multiplied by 100; i.e., it is a percent w/w.) The conversion was nearly 100%. The average molecular weight $\overline{M}_n$ determined by SEC was approximately 127,000 g/mol. The glass-transition temperature determined by DSC (Differential Scanning Calorimetry) was about 89.4° C. An approximately 0.5-mm-thick translucent film with a blue coloration was prepared by solvent evaporation. Its thickness was about 0.313 mm, and its transmittance was about 28%.

EXAMPLE 3

Approximately 10 grams of a random polybutadiene/styrene copolymer containing about 25% w/w styrene and having an average molecular weight of about $\overline{M}_n$=66,000 g/mol (E1502/Negromex), about 1.5 grams of TPES (where M=Si, $R_1$=$R_2$=$R_3$=$CH_3$, and $R_4$=$R_5$=H), and about 100 ml of toluene were placed in a 250-ml two-neck flask equipped with a magnetic agitator (bar stirrer), a condenser, and an argon inlet. The reaction mixture was homogenized by agitation and heated to reflux (i.e., boiling) for about 2 hours while continuing agitation. At the end of this time, the disappearance of the pink coloration caused by the persistent free radicals FR of formula A was observed; and the reaction was stopped until the ambient temperature was reached. The modified copolymer was recovered by precipitation in an excess of methanol, was filtered, and was dried under a vacuum. The modified polymer thus obtained was stored at a temperature of approximately −18oC and was protected from light.

In a second step, about 0.3 grams of the modified copolymer and about 3 ml of recently distilled styrene were placed in a thick-walled ignition tube provided with an agitator. The reaction medium was then degassed by means of cycles of cooling and heating between about −180° C. and the ambient temperature until most or all of the dissolved oxygen was eliminated. The tube with its contents was sealed under a vacuum with an oxygen-butane gas combustion torch and then was placed in an oil bath at a constant temperature of about 110° C. The conversion increased rapidly as a result of the temperature; and at the end of about 20 minutes, the agitator stopped due to the high viscosity. The conversion continued to increase; and the reacting mixture developed a spectacular iridescence, which was retained until the end of the experiment. The experiment was considered concluded at the end of about 3.5 hours (measured from the time that the polybutadiene/styrene copolymer was heated).

The tube was opened; and the resulting polymer mass was dissolved in toluene to determine the percentage of gel by centrifugation and the styrene conversion. The percentage of gel was about 5.7%, and the styrene conversion was approximately 71%. The preparation of films was carried out by solvent evaporation. The average molecular weight determined by SEC was approximately 165,000 g/mol. The glass-transition temperature determined by DSC was approximately 87° C.

Figure 2:
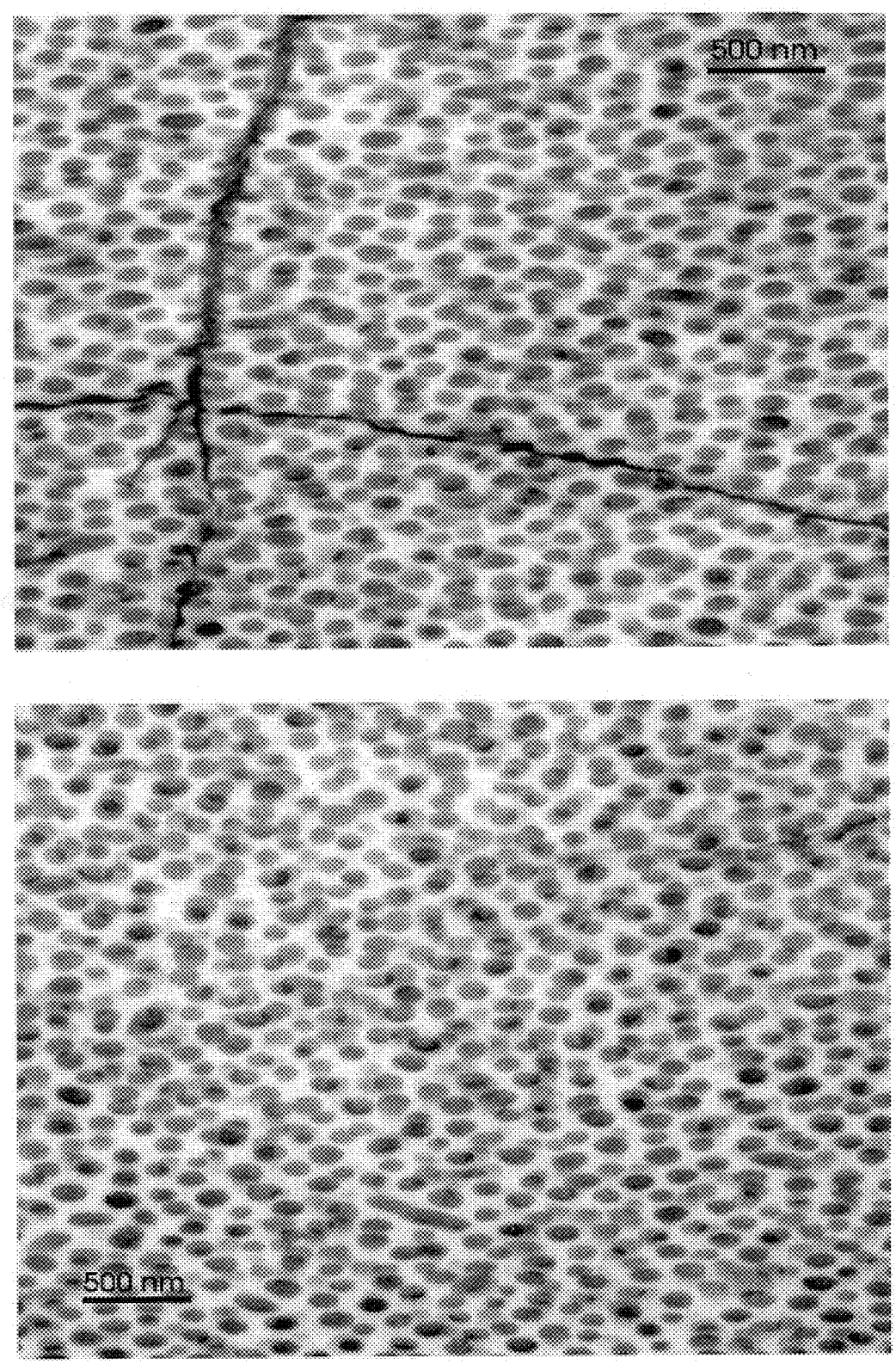
FIG. 2 is a TEM micrography of an ultrathin section of HIPS prepared according to Example 3, wherein the section was obtained by cryogenic ultramicrotomy of cast films and stained with $OsO_4$.

The micrographs of 100-nm-thick sections obtained by cryogenic microtomy and stained with $OSO_4$ show extremely fine particles with an average diameter of about 70 nm and a very narrow size distribution. It is also possible to observe the homogeneous spatial distribution of the particles and the apparent absence of polystyrene subinclusions (see, for example, FIG. 2).

EXAMPLE 4

Approximately 0.2 grams of a polybutadiene with an average molecular weight of about $\overline{M}_n$=155,000 g/mol (Buna/Bayer), about 16 milligrams of TFBPC (1,1,2,2-tetra (4-fluorophenyl)-bis(trimethylsilyloxy)ethane or TPES where M=Si, $R_1$=$R_2$=$R_3$=$CH_3$, and $R_4$=$R_5$=F), and about 10 ml of toluene were placed in a 50-ml two-neck flask equipped with a magnetic agitator, a condenser, and an argon inlet. The reaction mixture was homogenized by agitation and heated to boiling for about 3 hours with agitation. At the end of this time, the disappearance of a pale pink coloration caused by the persistent free radicals FR of formula A was observed; and the reaction was stopped by decreasing the temperature until the ambient temperature was reached. The modified copolymer was recovered by precipitation in an excess of methanol, was filtered, and was dried under a vacuum. The modified polymer thus obtained was stored at a temperature of about −18° C. and was protected from light.

In a second step, about 73 milligrams of the modified copolymer and about 1.13 grams of recently distilled styrene were placed in a thick-walled ignition tube provided with an agitator. The reaction medium was then degassed by means of cycles of cooling and heating between about −180° C. and the ambient temperature until most or all of the dissolved oxygen was eliminated. The tube with its contents was sealed under a vacuum with an oxygen-butane gas combustion torch and then was placed in an oil bath at a constant temperature of about 110° C. The conversion increased rapidly as a result of the temperature; and at the end of about 30 minutes, the agitator stopped due to the high viscosity. The conversion continued to increase and the reacting mixture developed a spectacular iridescence, which was retained until the end of the experiment. The experiment was considered concluded at the end of 4.5 hours (measured from the time that the polybutadiene/styrene copolymer was heated).

The tube was opened; and the resulting polymer mass was dissolved in toluene to determine the styrene conversion. The styrene conversion had a value of approximately 43%. The preparation of films was carried out by solvent evaporation. The transimittance of a 0.2-mm-thick film was about 60% at 650 nm (which is the wavelength of light).

EXAMPLE 5

Approximately 18 grams of polybutadiene having an average molecular weight of about $\overline{M}_n$=153,000 g/mol (S-255P/Negromex) and about 350 ml of distilled toluene were placed in a 500-ml two-neck flask equipped with a magnetic agitator, a condenser, and an argon inlet. Once the polybutadiene was dissolved, about 1.35 grams of TPES (where M=Si, $R_1$=$R_2$=$R_3$=$CH_3$, and $R_4$=$R_5$=H) were added, with agitation continuing until the mixture was homogenized. Then, the mixture was heated to boiling and kept in ref lux for about 3 hours. At the end of this time, the disappearance of the pink coloration caused by the presence of the persistent free radicals FR of formula A was observed; and the reaction was stopped until the ambient temperature was reached. The modified polymer was recovered by precipitation in an excess of methanol, was filtered, and was dried under a vacuum. The modified polymer thus obtained was stored under a vacuum at a temperature of about −18° C. and was protected from light. The values of E and F, which were determined from SEC and 1H NMR measurements, were 2% and 0.9, respectively.

In the second step, about 7 grams of the modified polybutadiene, about 10 grams of styrene, and about 140 grams of distilled toluene were placed in a 400-ml jacketed aluminum reactor with a conical bottom. The mixture was homogenized by means of magnetic agitation. The temperature was raised to approximately 120° C. and after about 7 hours of heating. The reaction was then stopped by cooling the reactor. When the solution reached the ambient temperature, the reacting mixture was filtered to eliminate and quantify the gel, with the copolymer being recovered by precipitation in an excess of methanol. The styrene conversion was calculated as approximately 26.2% from the data obtained by gravimetry. The percentage of gel obtained by the centrifugation method was approximately 27%. The average molecular weight $\overline{M}_n$ of the soluble part obtained by SEC was approximately 116,000 g/mol. The transmittance of an approximately 0.3-mm-thick film obtained by solvent evaporation was measured by UV at about 61%.

Figure 3:
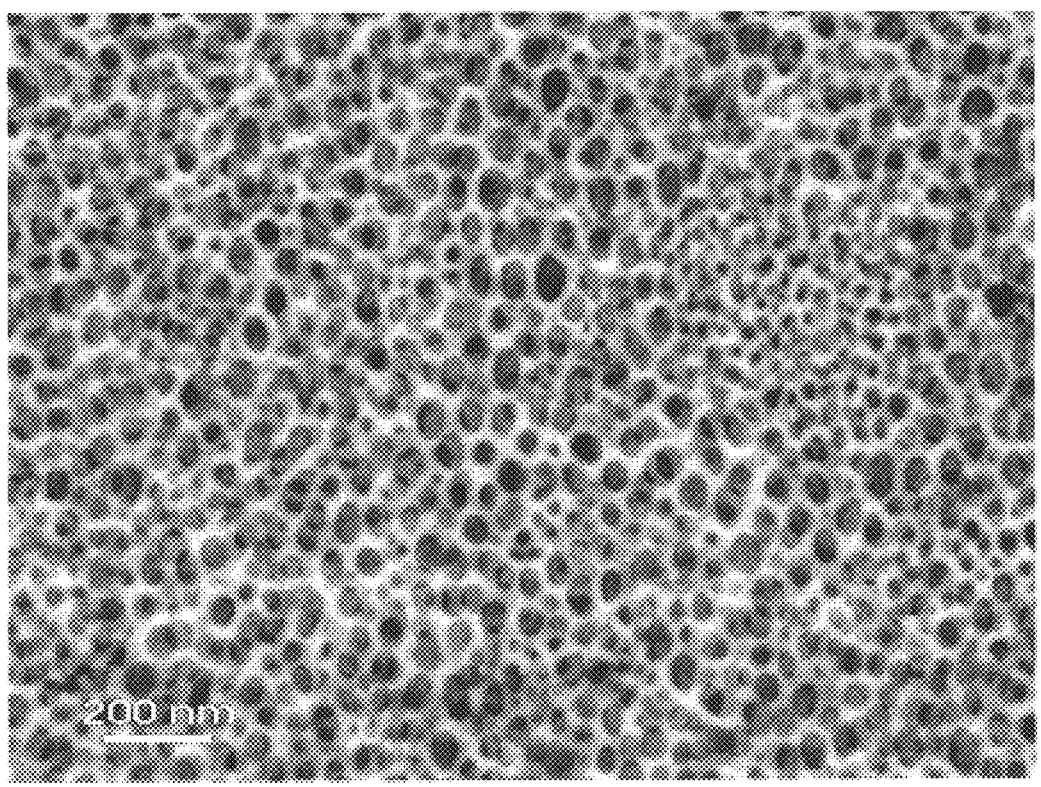
FIG. 3 is a TEM micrography of an ultrathin section of HIPS prepared according to Example 5, wherein the section was obtained by cryogenic ultramicrotomy of cast films and stained with $OsO_4$.
Figure 3:
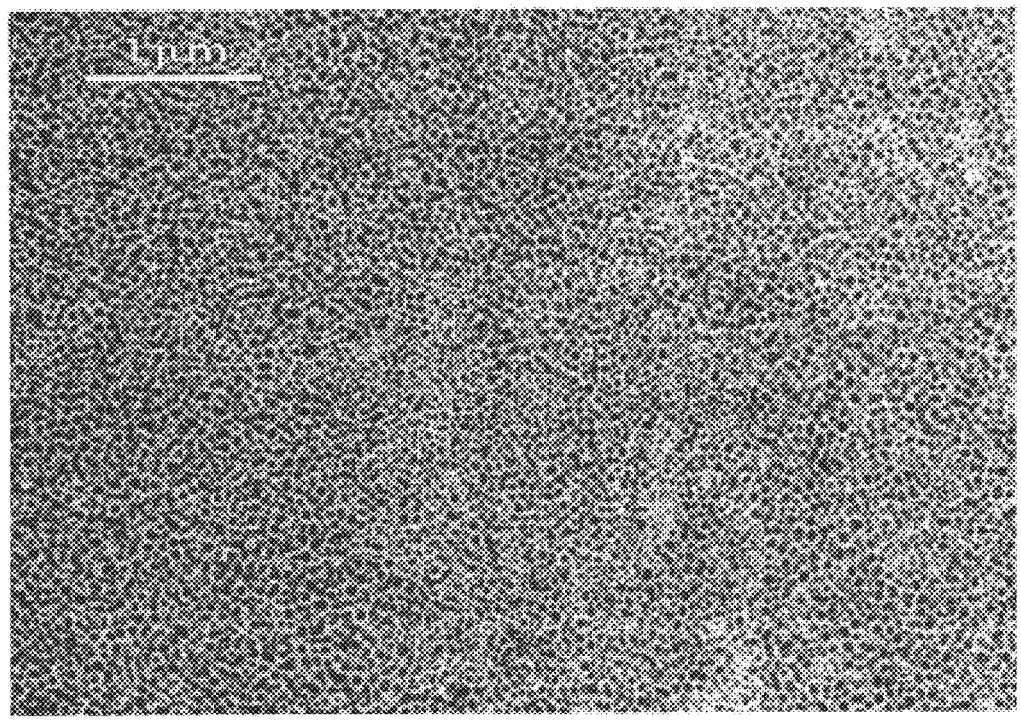

The TEM (Transmission Electron Microscopy) micrographs of 100-nm-thick sections obtained by cryogenic microtomy and stained with $OSO_4$ show extremely fine particles with an average diameter of about 50 nm and with a very narrow size distribution. It is also possible to observe the homogeneous spatial distribution of the particles and the apparent absence of polystyrene subinclusions (see, for example, FIG. 3).

EXAMPLE 6

Approximately 1.013 grams of a polybutadiene (Buna/Bayer) free of stabilizers (i.e., previously purified by precipitation of a dissolution in toluene in an excess of methanol, followed by filtration and drying under a vacuum) and about 50 ml of toluene were placed in a 250-ml two-neck flask equipped with a magnetic agitator, a condenser, and an argon inlet. Once the polymer was dissolved with agitation, about 0.0768 grams of TPES (where M=Si, $R_1$=$R_2$=$R_3$=$CH_3$, and $R_4$=$R_5$=H) were added, with agitation continuing until the mixture was homogenized. Then, the dissolution was heated to boiling and kept in a slow reflux for about 1 hour. At the end of this time, the TPES was consumed (as evidenced by the disappearance of the pink coloration); and the reaction was stopped until the ambient temperature was reached. The polymer was recovered by precipitation in an excess of methanol, was filtered, and was dried under a vacuum. The modified polymer was stored under a vacuum in a refrigerator at about −18° C. in an amber container (i.e., protected from light).

In a second step, about 0.214 grams of modified polybutadiene and about 3.018 grams of recently distilled styrene were placed in a thick-walled ignition tube provided with an agitator. After homogenization of the mixture, the solution was degassed by cycles of cooling and heating between about −180° C. and the ambient temperature until most or all of the dissolved oxygen was eliminated. The contents of the tube were frozen with liquid nitrogen, sealed under a vacuum, and then placed in a bath at a constant temperature of about 120° C. for about 3.5 hours. The reacting mixture developed a spectacular iridescence, which was retained until the end of the experiment. The tube was opened; and the resulting copolymer was dissolved and centrifuged to quantify the conversion and the percentage of gel. The conversion was approximately 73%, and the percentage of gel was approximately 8%. The average molecular weight $\overline{M}_n$ of the soluble fraction was calculated by SEC as approximately 176,000 g/mol. The glass-transition temperature determined by DSC was about 91.1° C. Film preparation was carried out by solvent evaporation, and the transmittance was about 67% for a film having a thickness of about 0.383 mm.

EXAMPLE 7

Approximately 3 grams of ethylene-propylene terpolymer (EPDM (EPSYN P597)) and about 111 ml of distilled toluene were placed in a 250-ml two-neck flask equipped with a magnetic agitator, a condenser, and an argon inlet. Once the EPDM was dissolved using magnetic agitation, about 0.465 grams of TPES (where M=Si, $R_1=R_2=R_3=CH_3$, and $R_4=R_5=H$) were added, with agitation continuing until the mixture was homogenized. The temperature was raised to boiling, and the heating was continued to obtain reflux for about 2 hours. At the end of this time, the disappearance of the pink coloration was observed, indicating complete or nearly complete consumption of the TPES. The heating was discontinued; and when the ambient temperature was reached, the modified polymer was recovered by precipitation in an excess of methanol, was filtered, and was dried under a vacuum. The EPDM thus modified was stored under a vacuum in a refrigerator at about −18° C. in an amber-colored flask (i.e., protected from light).

In the second step, about 0.308 grams of modified EPDM, about 3.026 grams of styrene, and about 2 ml of recently distilled benzene were placed in a thick-walled ignition tube. After being dissolved using magnetic agitation, the reaction medium was degassed by cycles of cooling and heating between about −180° C. and the ambient temperature until most or all of the dissolved oxygen was eliminated. The contents of the tube were frozen using liquid nitrogen and were sealed under a vacuum. The sealed tube was placed in an oil bath at a constant temperature of about 120° C. for about 27 hours. During the reaction, the reacting mixture developed an iridescence, which was retained until the end of the experiment. The tube was opened, and the resulting copolymer was dissolved to determine the conversion percentage and the percentage of gel. The conversion percentage was 76, and the percentage of gel was 17%. The SEC chromatogram was a monomodal curve; and the average molecular weight $\overline{M}_n$ was calculated as approximately 371,000 g/mol. The glass-transition temperatures determined by DSC were about −18° C. and about 94.42° C. (for EPDM and PS, respectively). The transmittance was approximately 74% for films obtained by solvent evaporation and having a thickness of about 0.207 mm.

EXAMPLE 8

Approximately 2.01 grams of polybutadiene S-255P (Negromex) and about 60 ml of distilled toluene were placed in a 250-ml two-neck flask equipped with a magnetic agitator, a condenser, and an argon inlet. Once the polybutadiene was dissolved with agitation, about 0.151 grams of TPES (where M=Si, $R_1=R_2=R_3=CH_3$, and $R_4=R_5=H$) were added; and agitation continued until the mixture was homogenized. Then, the mixture was heated to boiling and was kept in slow reflux for about 1 hour. In this period of time, the TPES was consumed, a fact which was confirmed by the disappearance of the pink coloration characteristic of the persistent free radicals FR of formula A. The solution was allowed to cool until its temperature reached the ambient temperature. Then the polymer was recovered by precipitation in an excess of methanol, was filtered, and was dried under a vacuum.

In the second step, about 0.095 grams, about 0.151 grams, and about 0.245 grams of modified polymer were placed in three different thick-walled ignition tubes provided with magnetic agitation. Approximately 3 grams of recently distilled methyl methacrylate was added to each tube; and the polymer was dissolved by means of agitation to obtain solutions having polymer concentrations by mass of approximately 3%, 5%, and 8%, respectively. The solution of each tube was degassed by cycles of cooling and heating between about −180° C. and the ambient temperature until most or all of the dissolved oxygen was eliminated. The contents of the tubes were frozen with liquid nitrogen and were sealed under a vacuum. The sealed tubes were placed in an oil bath at a constant temperature of about 130° C. Immediately or almost immediately, the reacting mixture developed iridescence, which was retained until the end of the experiment. The experiment lasted 5 hours (measured from the time that the polybutadiene was mixed with the toluene). The resulting copolymers were dissolved in toluene and precipitated in an excess of methanol to determine the conversion percentages, which were approximately 98%, 94%, and 99% for the polymer concentrations of about 3%, 5%, and 8%, respectively. The glass-transition temperatures determined by DSC were approximately 82.7° C., 71.9° C., and 88° C. for the polymer concentrations of about 3%, 5%, and 8%, respectively. The gel content determined by centrifugation was approximately 11%, 15%, and 84% for the polymer concentrations of 3%, 5%, and 8%, respectively. The transmittance was greater than about 53% in all the cases for films of an average thickness of about 0.25 mm. The flexibility of the films increased with the polybutadiene content.

The average molecular weight $\overline{M}_n$, which was determined by SEC, was approximately 371,000 g/mol, 391,000 g/mol, and 335,000 g/mol for the polymer concentrations of about 3%, 5%, and 8%, respectively.

EXAMPLE 9

We preformed some experiments in which we dissolved TPES in a small amount of toluene. Then we added this resulting solution to the elastomer (in the molten state), which was being heated in a Brabender (Heated Screw Blender). During this heating treatment, the elastomer displayed the typical pink color (for around 20 minutes). Soon after this treatment, the elastomer was dissolved in styrene monomer ($M_2$) to produce nanodispersions.

For example, approximately 70 g of polybutdiene (Buna/Bayer) were placed in an internal mixer Brabender-type thermostated temperatures in the range of about 80–110° C. During the polybutadiene heating, about 3.5g TPES (approximately 5% w/w with respect to PB) corresponding to the formula C and dissolved in about 30–50 ml of toluene were dropped in and mixed with the PB. The elastomer-TPES mixture slowly displayed a pink color due to the dissociation of the dimer. As soon as the level of torque reach a stable value (usually about 10–15 minutes) and before crosslinking appeared (as shown by an increase of torque), the reaction was stopped by taking off the polybutadiene mixture from the heating element. At this time, the polybutadiene mixture still displayed the characteristic pink color of the persistent free radicals FR of formula A. Soon after this treatment and before this color disappeared due to the effect of the decreasing in temperature, the polybutadiene mixture was placed in a flask containing about 800 g of styrene (to give an approximately 8% w/w solution). After the PB dissolved, the PB/styrene solution was placed in a 1-gallon stainless steel flat-bottom Parr reactor provided with an anchor-type agitator and a turbine. The solution was bubbled with nitrogen for several hours to reduce or eliminate the dissolved oxygen; and the temperature of the reactor was raised to approximately 120° C. while constant agitation of about 100 rpm was maintained. At the end of about 30 minutes of reaction, the styrene conversion reached a value of approximately 20%. At that time, the temperature of the reactor was lowered to ambient temperature; and the reactor was charged with two liters of aqueous solution. Said solution was made up of about 2 liters of water, about 1.4 g of partially hydrolyzed alcohol, about 1.6 g of sodium chloride, and about 0.4 g of nonylphenol. The reactor was closed again, saturated with nitrogen, heated to approximately 130° C. for about 6 hours, then heated to approximately 150° C. for about two additional hours, and then cooled to about or below the ambient or room temperature (e.g., about 20–25° C.). In the suspension step, agitation was maintained at about 500 rpm. When this treatment was completed, the temperature was raised to about the ambient temperature; and the reactor was opened to collect about 870 g of translucent white beads of approximately uniform size. A translucent film was prepared by a solvent evaporation technique.

Appendix A, which is filed herewith, includes additional examples.

DOCUMENTS

FOREIGN PATENTS

U.S. Pat. No. 5,043,404 (Aug. 27, 1991)
U.S. Pat. No. 4,777,210 (Oct. 11, 1988)

OTHER DOCUMENTS

*Plastics Additives and Modifiers Handbook*, ed. Jesse Edenbaum, Published by Van Nostrand Reinhold, New York 1992. J. Silberberg, C. D. Han, J. of Applied Polymer Science Vol. 22, 599–609 (1978)

*The Effect of Rubber Particle Size on the Mechanical Properties of High Impact Polystyrene* Ping L. Ku, *Polystyrene and Styrene Copolymers: Their Manufacture and Application*. II Advances in Polymer Technology Vol. 8, No. 3, 201–223 (1988)

All of the publications mentioned in this application (including, but not necessarily limited to, *Polymer Preprints ACS*, 38(1) 667–668 (1997)) are incorporated herein by this reference.

The invention illustratively disclosed herein suitably may be practiced in the absence of any element which is not specifically disclosed herein.

The following claims are entitled to the broadest possible scope consistent with this application.

What is claimed is:

1. A method for functionalizing a polymer, the method comprising reacting the polymer with a free radical of formula A to yield a functionalized polymer having a thermodissociable bond between the polymer and the free radical, wherein formula A is

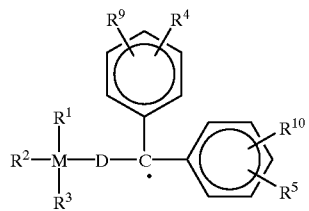

Formula A wherein $R^1$, $R^2$, and $R^3$ are the same or different and are each independently selected from the group consisting of R;

wherein M is a silicon or germanium atom;

wherein

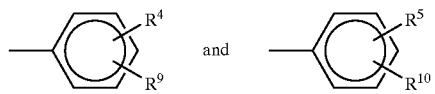

are the same or different radicals which are each independently selected from among aromatic cyclic hydrocarbons, wherein the aromatic cyclic hydrocarbons may contain one or more heteroatoms in ortho, meta, and/or para positions and/or may have one or more substituents at the ortho, meta, and/or para positions with the substituents being selected from the group consisting of halogens, —$NO_2$, —OR, R, and —OH, and wherein when the phenyl moieties of the radicals

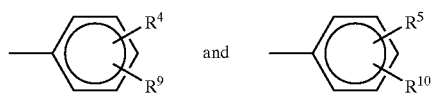

are directly linked to the same carbon atom, the radicals

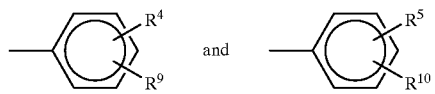

may form divalent diaryl groups selected from among:

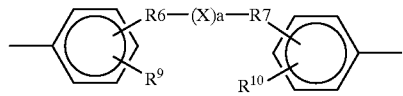

wherein $R^6$ and $R^7$ are the same or different and are each independently selected from the group consisting of multivalent substituted $C_{6-13}$ cyclic aromatic hydrocarbons, non-substituted $C_{6-13}$ cyclic aromatic hydrocarbons, substituted $C_{6-13}$ linear hydrocarbons, substituted $C_{6-13}$ branched hydrocarbons, non-substituted $C_{6-13}$ linear hydrocarbons, and non-substituted $C_{6-13}$ branched hydrocarbons, wherein a is 0 or 1, and wherein X is selected from the group consisting of —O—, —S—, —$CH_2$— and

and wherein D is oxygen or

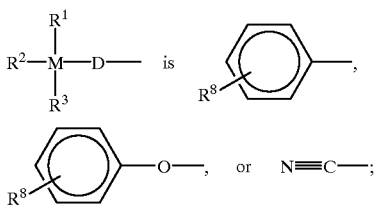

wherein $R^4$, $R^5$, $R^8$, $R^9$, and $R^{10}$ are the same or different and are each independently selected from the group consisting of H, halogens, —$NO_2$, —OR, R, and —OH;

wherein $R^1$, $R^2$, and $R^3$ are the same or different and are each independently selected from the group consisting of H, —OR, and R; and wherein each R is independently selected from the monovalent groups consisting of:
- $C_{1-13}$ substituted linear hydrocarbons,
- $C_{1-13}$ non-substituted linear hydrocarbons,
- $C_{1-13}$ substituted branched hydrocarbons,
- $C_{1-13}$ non-substituted branched hydrocarbons,
- $C_{3-13}$ substituted cyclic hydrocarbons,
- $C_{3-13}$ non-substituted cyclic hydrocarbons,
- $C_{6-13}$ substituted cyclic aromatic hydrocarbons,
- $C_{6-13}$ non-substituted cyclic aromatic hydrocarbons,
- $C_{6-13}$ substituted cyclic aromatic hydrocarbons containing heteroatoms, and
- $C_{6-13}$ non-substituted cyclic aromatic hydrocarbons containing heteroatoms;

wherein the method for functionalizing a polymer yields the functionalized polymer in a reaction medium, and wherein the method further comprises separating the functionalized polymer from the reaction medium.

2. A method as claimed in claim 1, wherein the polymer is linear, branched, saturated, or unsaturated.

3. A method as claimed in claim 2, wherein the polymer is an elastomer, a thermoplastic, a thermoset, or mixtures thereof.

4. A method as claimed in claim 3, wherein the polymer has labile substituents, the substituents being selected from the group consisting of H, protons belonging to chemical groups, and halogens.

5. A method as claimed in claim 4, wherein the polymer is saturated or unsaturated, wherein the polymer is selected from the group consisting of polybutadiene, butadiene copolymers and terpolymers, polyisoprene, copolymers and terpolymers of isoprene, ethylene-propylene-diene monomers and terpolymers (EPDM), polychloroprene, copolymers and terpolymers of chloroprene, polyvinyl chloride, copolymers and terpolymers of vinyl chloride, natural rubber regardless of its origin, alkyl methacrylates, alkyl polyacrylates, polyacetylenes, poly(acrylonitrile), poly(vinylacetate), polyesters, polyamides, and polymers from butadiene, isoprene, chloroprene, EPDM, and mixtures thereof.

6. A method as claimed in claim 1, wherein the free radical is generated from a dimer of the free radical of formula A.

7. A method as claimed in claim 2, wherein the free radical is generated from a dimer of the free radical of formula A.

8. A method as claimed in claim 2, wherein the free radical is selected from the group consisting of substituted diphenylacetonitryl, unsubstituted diphenylacetonitryl, substituted diphenylphenyloxymethyl, unsubstituted diphenylphenyloxymethyl, substituted triphenylmethyl, unsubstituted triphenylmethyl, substituted diphenyltrialkylgermaniumyloxymethyl, unsubstituted diphenyltrialkylgermaniumyloxymethyl, substituted diphenyltrialkylsilyloxymethyl, and unsubstituted diphenyltrialkylsilyloxymethyl.

9. A method as claimed in claim 2, wherein the free radical is generated from a free radical generator selected from the group consisting of substituted tetrephenylethanes; 1,1,2,2-tetraphenyl-bis(trimethylsilyloxy)ethane; 1,1,2,2-tetra(pentafluorophenyl)-bis(trimethylsilyloxy)ethane; 1,2-di-2(fluorophenyl)-1,2-diphenyl-bis(trimethylsilyloxy)ethane; 1,1,2,2-tetra(4-fluorophenyl)-bis(trimethylsilyloxy)ethane; oligo[1,1,2,2-tetraphenyl-bis(trimethylsilyloxy)ethane]; dimethyl-bis(diphenylmethoxy)silane; bis(fluorenyltrimethylsilyloxy); 1,2-di(4-methylphenyl)-1,2-diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis(dimethylphenylsilyloxy)ethane; 1,2-di(2-pyridyl)-1,2-bis(trimethylsilyloxy)ethane; bis(benzanthronetrimethylsilyloxy); bis(xanthonetrimethylsilyloxy); and mixtures thereof.

10. A method as claimed in claim 6, wherein the dimer is selected from the group consisting of substituted tetraphenylethanes; and wherein the polymer is selected from the group consisting of polybutadienes with any microstructure, copolymers and terpolymers based on butadiene with any topology and with any molar amount of monomers comprising the copolymers and terpolymers, ethylene-propylene-diene monomers and terpolymers with any topology and with any molar amount of monomers comprising the terpolymers, polyisoprene and its copolymers with any topology and with any molar amount of monomers comprising the copolymers, polychloroprenes and copolymers of chloroprene with any topology with any molar amount of monomers comprising the copolymers, polyvinyl chlorides and copolymers of vinyl chlorides, natural rubber regardless of its origin, alkyl polymethacrylates, alkyl polyacrylates, polyacetylenes, polyacrylonitriles, polyvinyl acetate, and mixtures thereof.

11. A functionalized polymer prepared according to the method claimed in claim 1.

12. A functionalized polymer prepared according to the method claimed in claim 5.

13. A functionalized polymer prepared according to the method claimed in claim 8.

14. A functionalized polymer prepared according to the method claimed in claim 9.

15. A method as claimed in claim 4, wherein the polymer is selected from a group consisting of polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes, and mixtures thereof.

16. A method for functionalizing a polymer as claimed in claim 1, wherein the step of separating the functionalized polymer from the reaction medium comprises precipitating the functionalized polymer.

17. A method for functionalizing a polymer, the method comprising reacting the polymer with a free radical of formula A to yield a functionalized polymer having a thermodissociable bond between the polymer and the free radical, wherein formula A is Formula A

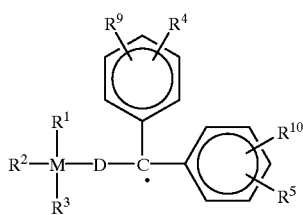

wherein $R^1$, $R^2$, and $R^3$ are the same or different and are each independently selected from the group consisting of R;

wherein M is a silicon or germanium atom;

wherein

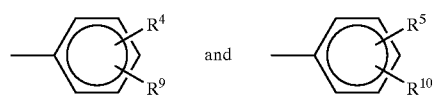

are the same or different radicals which are each independently selected from among aromatic cyclic hydrocarbons, wherein the aromatic cyclic hydrocarbons may contain one or more heteroatoms in ortho, meta, and/or para positions and/or may have one or more substituents at the ortho, meta, and/or para positions with the substituents being selected from the group consisting of halogens, —$NO_2$, —OR, R, and —OH, and wherein when the phenyl moieties of the radicals

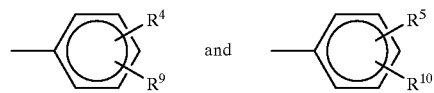

are directly linked to the same carbon atom, the radicals

may form divalent diaryl groups selected from among:

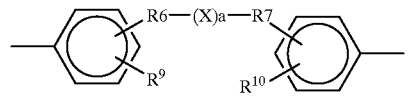

wherein $R^6$ and $R^7$ are the same or different and are each independently selected from the group consisting of multivalent substituted $C_{6-13}$ cyclic aromatic hydrocarbons, non-substituted $C_{6-13}$ cyclic aromatic hydrocarbons, substituted $C_{6-13}$ linear hydrocarbons, substituted $C_{6-13}$ branched hydrocarbons, non-substituted $C_{6-13}$ linear hydrocarbons, and non-substituted $C_{6-13}$ branched hydrocarbons, wherein a is 0 or 1, and wherein X is selected from the group consisting of —O—, —S—, —$CH_2$— and

and wherein D is oxygen or

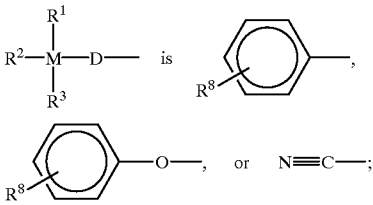

wherein $R^4$, $R^5$, $R^8$, $R^9$, and $R^{10}$ are the same or different and are each independently selected from the group consisting of H, halogens, —$NO_2$, —OR, R, and —OH;

wherein $R^1$, $R^2$, and $R^3$ are the same or different and are each independently selected from the group consisting of H, —OR, and R; and wherein each R is independently selected from the monovalent groups consisting of:
$C_{1-13}$ substituted linear hydrocarbons,
$C_{1-13}$ non-substituted linear hydrocarbons,
$C_{1-13}$ substituted branched hydrocarbons,
$C_{1-13}$ non-substituted branched hydrocarbons,
$C_{3-13}$ substituted cyclic hydrocarbons,
$C_{3-13}$ non-substituted cyclic hydrocarbons,
$C_{6-13}$ substituted cyclic aromatic hydrocarbons,
$C_{6-13}$ non-substituted cyclic aromatic hydrocarbons,
$C_{6-13}$ substituted cyclic aromatic hydrocarbons containing heteroatoms, and
$C_{6-13}$ non-substituted cyclic aromatic hydrocarbons containing heteroatoms;

wherein after the functionalized polymer is prepared, the functionalized polymer is stored for up to about one week.

18. A method for functionalizing a polymer, the method comprising reacting the polymer with a free radical of formula A to yield a functionalized polymer having a thermodissociable bond between the polymer and the free radical, wherein formula A is Formula A

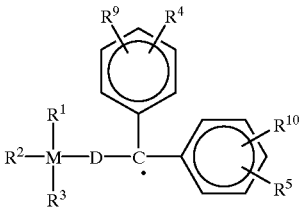

wherein $R^1$, $R^2$, and $R^3$ are the same or different and are each independently selected from the group consisting of R;

wherein M is a silicon or germanium atom;

wherein

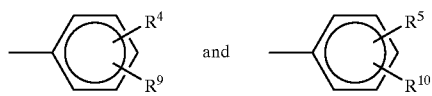

are the same or different radicals which are each independently selected from among aromatic cyclic hydrocarbons, wherein the aromatic cyclic hydrocarbons may contain one or more heretoatoms in ortho, meta, and/or para positions and/or may have one or more substituents at the ortho, meta, and/or para positions with the substituents being selected from the groups consisting of halogens, —$NO_2$, —OR, R, and —OH, and wherein when the phenyl moieties of the radicals

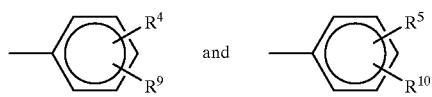

are directly linked to the same carbon atom, the radicals

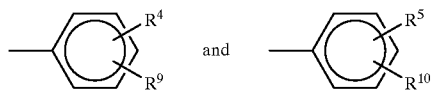

may form divalent diaryl groups selected from among:

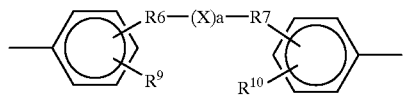

wherein $R^6$ and $R^7$ are the same or different and are each independently selected from the group consisting of multivalent substituted $C_{6-13}$ cyclic aromatic hydrocarbons, non-substituted $C_{6-13}$ cyclic aromatic hydrocarbons, substituted $C_{6-13}$ linear hydrocarbons, substituted $C_{6-13}$ branched hydrocarbons, non-substituted $C_{6-13}$ linear hydrocarbons, and non-substituted $C_{6-13}$ branched hydrocarbons, wherein a is 0 or 1, and wherein X is selected from the group consisting of —O—, —S—, —$CH_2$— and

and wherein D is oxygen or

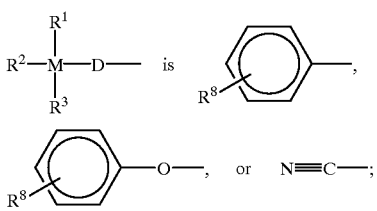

wherein $R^4$, $R^5$, $R^8$, $R^9$, and $R^{10}$ are the same or different and are each independently selected from the group consisting of H, halogens, —$NO_2$, —OR, R, and —OH;

wherein $R^1$, $R^2$, and $R^3$ are the same or different and are each independently selected from the group consisting of H, —OR, and R; and wherein each R is independently selected from the monovalent groups consisting of:
$C_{1-13}$ substituted linear hydrocarbons,
$C_{1-13}$ non-substituted linear hydrocarbons,
$C_{1-13}$ substituted branched hydrocarbons,
$C_{1-13}$ non-substituted branched hydrocarbons,
$C_{3-13}$ substituted cyclic hydrocarbons,
$C_{3-13}$ non-substituted cyclic hydrocarbons,
$C_{6-13}$ substituted cyclic aromatic hydrocarbons,
$C_{6-13}$ non-substituted cyclic aromatic hydrocarbons,
$C_{6-13}$ substituted cyclic aromatic hydrocarbons containing heteroatoms, and
$C_{6-13}$ non-substituted cyclic aromatic hydrocarbons containing heteroatoms;

wherein after the functionalized polymer is prepared, the functionalized polymer is stored for more than about one week.

19. A method for preparing a copolymer or terpolymer, the method comprising:

(a) preparing a functionalized polymer by a reacting a polymer with a free radical of formula A to yield the functionalized polymer, wherein the functionalized polymer has a thermodissociable bond between the polymer and the free radical of formula A, wherein formula A is

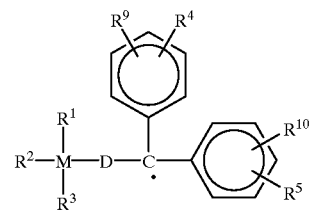

Formula A wherein $R^1$, $R^2$, and $R^3$ are the same or different and are each independently selected from the group consisting of R;

wherein M is a silicon or germanium atom;

wherein

are the same or different radicals which are each independently selected from among aromatic cyclic hydrocarbons, wherein the aromatic cyclic hydrocarbons may contain one or more heteroatoms in ortho, meta, and/or para positions and/or may have one or more substituents at the ortho, meta, and/or para positions with the substituents being selected from the group consisting of halogens, —$NO_2$, —OR, R, and —OH, and wherein when the phenyl moieties of the radicals

are directly linked to the same carbon atom, the radicals

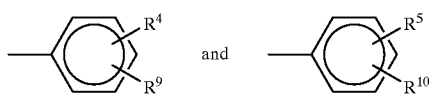

may form divalent diaryl groups selected from among:

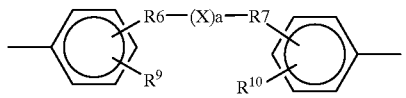

wherein $R^6$ and $R^7$ are the same or different and are each independently selected from the group consisting of multivalent substituted $C_{6-13}$ cyclic aromatic hydrocarbons, non-substituted $C_{6-13}$ cyclic aromatic hydrocarbons, substituted $C_{6-13}$ linear hydrocarbons, substituted $C_{6-13}$ branched hydrocarbons, non-substituted $C_{6-13}$ linear hydrocarbons, and non-substituted $C_{6-13}$ branched hydrocarbons, wherein a is 0 or 1, and wherein X is selected from the group consisting of —O—, —S—, —CH$_2$— and

and wherein D is oxygen or

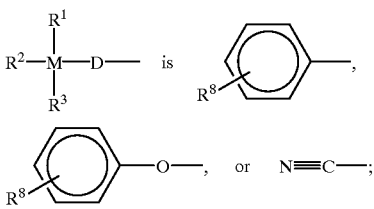

wherein $R^4$, $R^5$, $R^8$, $R^9$, and $R^{10}$ are the same or different and are each independently selected from the group consisting of H, halogens, —NO$_2$, —OR, R, and —OH;

wherein $R^1$, $R^2$, and $R^3$ are the same or different and are each independently selected from the group consisting of H, —OR, and R; and wherein each R is independently selected from the monovalent groups consisting of:
$C_{1-13}$ substituted linear hydrocarbons,
$C_{1-13}$ non-substituted linear hydrocarbons,
$C_{1-13}$ substituted branched hydrocarbons,
$C_{1-13}$ non-substituted branched hydrocarbons,
$C_{3-13}$ substituted cyclic hydrocarbons,
$C_{3-13}$ non-substituted cyclic hydrocarbons,
$C_{6-13}$ substituted cyclic aromatic hydrocarbons,
$C_{6-13}$ non-substituted cyclic aromatic hydrocarbons,
$C_{6-13}$ substituted cyclic aromatic hydrocarbons containing heteroatoms, and
$C_{6-13}$ non-substituted cyclic aromatic hydrocarbons containing heteroatoms; and (b) then initiating polymerization of a monomer or a mixture of monomers with the functionalized polymer to yield the copolymer or terpolymer.

20. A method for preparing a copolymer or terpolymer, the method comprising:
(a) preparing a functionalized polymer by a reacting a polymer with a free radical of formula A to yield the functionalized polymer in a reaction medium, wherein the functionalized polymer has a thermodissociable bond between the polymer and the free radical of formula A, and wherein formula A is Formula A

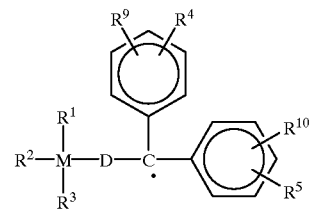

wherein $R^1$, $R^2$, and $R^3$ are the same or different and are each independently selected from the group consisting of R;

wherein M is a silicon or germanium atom;

wherein

are the same or different radicals which are each independently selected from among aromatic cyclic hydrocarbons, wherein the aromatic cyclic hydrocarbons may contain one or more heteroatoms in ortho, meta, and/or para positions and/or may have one or more substituents at the ortho, meta, and/or para positions with the substituents being selected from the group consisting of halogens, —NO$_2$, —OR, R, and —OH, and wherein when the phenyl moieties of the radicals

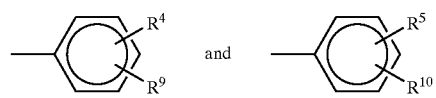

are directly linked to the same carbon atom, the radicals

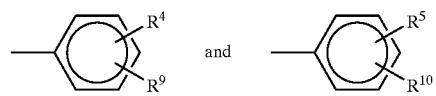

may form divalent diaryl groups selected from among:

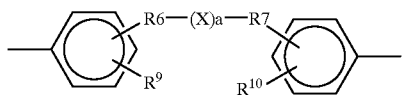

wherein $R^6$ and $R^7$ are the same or different and are each independently selected from the group consisting of multivalent substituted $C_{6-13}$ cyclic aromatic hydrocarbons, non-substituted $C_{6-13}$ cyclic aromatic hydrocarbons, substituted $C_{6-13}$ linear hydrocarbons, substituted $C_{6-13}$ branched hydrocarbons, non-substituted $C_{6-13}$ linear hydrocarbons, and non-substituted $C_{6-13}$ branched hydrocarbons, wherein a is 0 or 1, and wherein X is selected from the group consisting of —O—, —S—, —$CH_2$— and

and wherein D is oxygen or

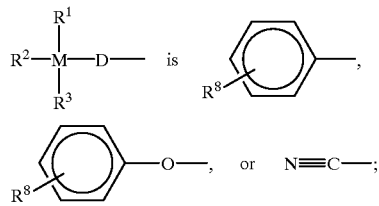

wherein $R^4$, $R^5$, $R^8$, $R^9$, and $R^{10}$ are the same or different and are each independently selected from the group consisting of H, halogens, —$NO_2$, —OR, R, and —OH;

wherein $R^1$, $R^2$, and $R^3$ are the same or different and are each independently selected from the group consisting of H, —OR, and R; and wherein each R is independently selected from the monovalent groups consisting of:
$C_{1-13}$ substituted linear hydrocarbons,
$C_{1-13}$ non-substituted linear hydrocarbons,
$C_{1-13}$ substituted branched hydrocarbons,
$C_{1-13}$ non-substituted branched hydrocarbons,
$C_{3-13}$ substituted cyclic hydrocarbons,
$C_{3-13}$ non-substituted cyclic hydrocarbons,
$C_{6-13}$ substituted cyclic aromatic hydrocarbons,
$C_{6-13}$ non-substituted cyclic aromatic hydrocarbons,
$C_{6-13}$ substituted cyclic aromatic hydrocarbons containing heteroatoms, and
$C_{6-13}$ non-substituted cyclic aromatic hydrocarbons containing heteroatoms;

(b) separating the functionalized polymer from the reaction medium; and (c) then, after step (b), initiating polymerization of a monomer or a mixture of monomers with the functionalized polymer to yield the copolymer or terpolymer.

21. A method for preparing a copolymer or terpolymer as claimed in claim 20, wherein the step of separating the functionalized polymer from the reaction medium comprises precipitating the functionalized polymer.

22. A method for preparing a copolymer or terpolymer, the method comprising:

(a) providing a functionalized polymer, wherein the functionalized polymer was prepared by a reacting a polymer with a free radical of formula A to yield the functionalized polymer, wherein the functionalized polymer has a thermodissociable bond between the polymer and the free radical of formula A, and wherein formula A is Formula A

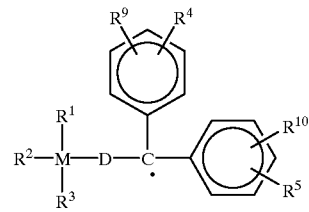

wherein $R^1$, $R^2$, $R^3$ are the same or different and are each independently selected from the group consisting of R; wherein M is a silicon or germanium atom; wherein

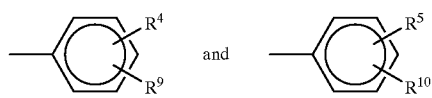

are the same or different radicals which are each independently selected from among aromatic cyclic hydrocarbons, wherein the aromatic cyclic hydrocarbons may contain one or more heteroatoms in ortho, meta, and/or para positions and/or may have one or more substituents at the ortho, meta, and/or para positions with the substituents being selected from the group consisting of halogens, —$NO_2$, —OR, R, and —OH, and wherein when the phenyl moieties of the radicals

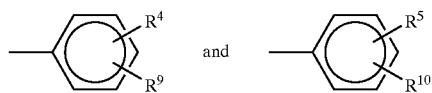

are directly linked to the same carbon atom, the radicals

may form divalent diaryl groups selected from among:

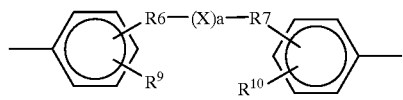

wherein $R^6$ and $R^7$ are the same or different and are each independently selected from the group consisting of multivalent substituted $C_{6-13}$ cyclic aromatic hydrocarbons, non-substituted $C_{6-13}$ cyclic aromatic hydrocarbons, substituted $C_{6-13}$ linear hydrocarbons, substituted $C_{6-13}$ branched hydrocarbons, non-substituted $C_{6-13}$ linear hydrocarbons, and non-substituted $C_{6-13}$ branched hydrocarbons, wherein a is 0 or 1, and wherein X is selected from the group consisting of —O—, —S—, —CH$_2$— and

and wherein D is oxygen or

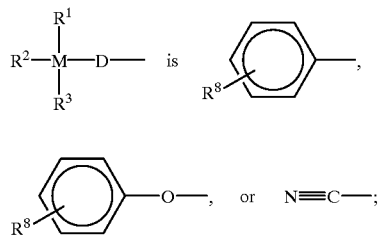

wherein R$^4$, R$^5$, R$^8$, R$^9$, and R$^{10}$ are the same or different and are each independently selected from the group consisting of H, halogens, —NO$_2$, —OR, R, and —OH;

wherein R$^1$, R$^2$, and R$^3$ are the same or different and are each independently selected from the group consisting of H, —OR, and R; and wherein each R is independently selected from the monovalent groups consisting of:
- C$_{1-13}$ substituted linear hydrocarbons,
- C$_{1-13}$ non-substituted linear hydrocarbons,
- C$_{1-13}$ substituted branched hydrocarbons,
- C$_{1-13}$ non-substituted branched hydrocarbons,
- C$_{3-13}$ substituted cyclic hydrocarbons,
- C$_{3-13}$ non-substituted cyclic hydrocarbons,
- C$_{6-13}$ substituted cyclic aromatic hydrocarbons,
- C$_{6-13}$ non-substituted cyclic aromatic hydrocarbons,
- C$_{6-13}$ substituted cyclic aromatic hydrocarbons containing heteroatoms, and
- C$_{6-13}$ non-substituted cyclic aromatic hydrocarbons containing heteroatoms;

(b) dissolving the functionalized polymer in a monomer or a mixture of monomers to initiate polymerization of the monomer or the mixture of monomers with the functionalized polymer to yield the copolymer or terpolymer.

23. A method for preparing a copolymer or terpolymer, the method comprising:

(a) providing a functionalized polymer in a reaction medium, wherein the functionalized polymer was prepared by a reacting a polymer with a free radical of formula A to yield the functionalized polymer in the reaction medium, wherein the functionalized polymer has a thermodissociable bond between the polymer and the free radical of formula A, and wherein formula A is Formula A

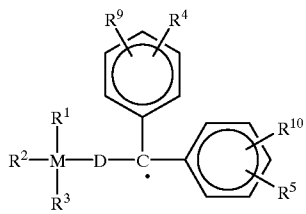

wherein R$^1$, R$^2$, and R$^3$ are the same or different and are each independently selected from the group consisting of R;

wherein M is a silicon or germanium atom;

wherein

are the same or different radicals which are each independently selected from among aromatic cyclic hydrocarbons, wherein the aromatic cyclic hydrocarbons may contain one or more heteroatoms in ortho, meta, and/or para positions and/or may have one or more substituents at the ortho, meta, and/or para positions with the substituents being selected from the group consisting of halogens, —NO$_2$, —OR, R, and —OH, and wherein when the phenyl moieties of the radicals

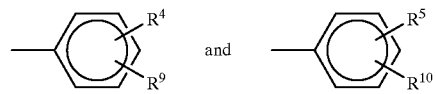

are directly linked to the same carbon atom, the radicals

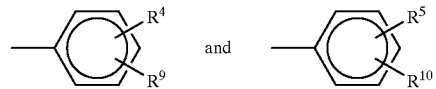

may form divalent diaryl groups selected from among:

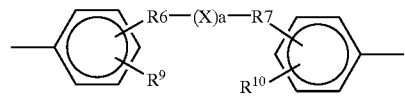

wherein R$^6$ and R$^7$ are the same or different and are each independently selected from the group consisting of multivalent substituted C$_{6-13}$ cyclic aromatic hydrocarbons, non-substituted C$_{6-13}$ cyclic aromatic hydrocarbons, substituted C$_{6-13}$ linear hydrocarbons, substituted C$_{6-13}$ branched hydrocarbons, non-substituted C$_{6-13}$ linear hydrocarbons, and non-substituted C$_{6-13}$ branched hydrocarbons, wherein a is 0 or 1, and wherein X is selected from the group consisting of —O—, —S—, —CH$_2$— and

and wherein D is oxygen or

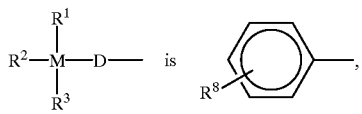

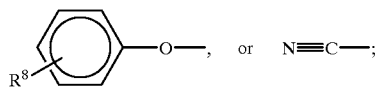

wherein $R^4$, $R^5$, $R^8$, $R^9$, and $R^{10}$ are the same or different and are each independently selected from the group consisting of H, halogens, $-NO_2$, $-OR$, R, and $-OH$;

wherein $R^1$, $R^2$, and $R^3$ are the same or different and are each independently selected from the group consisting of H, $-OR$, and R; and wherein each R is independently selected from the monovalent groups consisting of:

$C_{1-13}$ substituted linear hydrocarbons, $C_{1-13}$ non-substituted linear hydrocarbons, $C_{1-13}$ substituted branched hydrocarbons, $C_{1-13}$ non-substituted branched hydrocarbons, $C_{3-13}$ substituted cyclic hydrocarbons, $C_{3-13}$ non-substituted cyclic hydrocarbons, $C_{6-13}$ substituted cyclic aromatic hydrocarbons, $C_{6-13}$ non-substituted cyclic aromatic hydrocarbons, $C_{6-13}$ substituted cyclic aromatic hydrocarbons containing heteroatoms, and $C_{6-13}$ non-substituted cyclic aromatic hydrocarbons containing heteroatoms;

(b) separating the functionalized polymer from the reaction medium; and (c) then, after step (b), dissolving the functionalized polymer in a monomer or a mixture of monomers to initiate polymerization of the monomer or the mixture of monomers with the functionalized polymer to yield the copolymer or terpolymer.

24. A method for preparing a copolymer or terpolymer as claimed in claim 23, wherein the step of separating the functionalized polymer from the reaction medium comprises precipitating the functionalized polymer.

25. A method for preparing a copolymer or terpolymer, the method comprising:

(a) preparing a functionalized polymer by a reacting a polymer with a free radical of formula A to yield the functionalized polymer in a reaction medium, wherein the functionalized polymer has a thermodissociable bond between the polymer and the free radical of formula A, and wherein formula A is Formula A

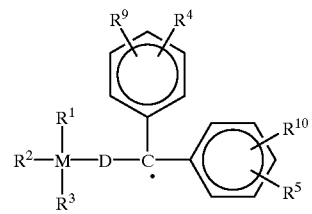

wherein $R^1$, $R^2$, and $R^3$ are the same or different and are each independently selected from the group consisting of R;

wherein M is a silicon or germanium atom;

wherein

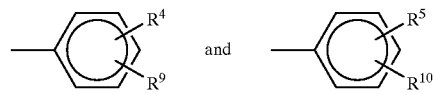

are the same or different radicals which are each independently selected from among aromatic cyclic hydrocarbons, wherein the aromatic cyclic hydrocarbons may contain one or more heteroatoms in ortho, meta, and/or para positions and/or may have one or more substituents at the ortho, meta, and/or para positions with the substituents being selected from the group consisting of halogens, $-NO_2$, $-OR$, R, and $-OH$, and wherein when the phenyl moieties of the radicals

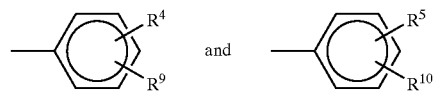

are directly linked to the same carbon atom, the radicals

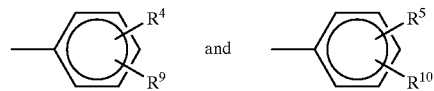

may form divalent diaryl groups selected from among:

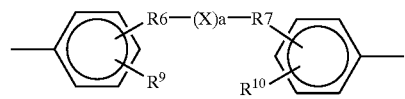

wherein $R^6$ and $R^7$ are the same or different and are each independently selected from the group consisting of multivalent substituted $C_{6-13}$ cyclic aromatic hydrocarbons, non-substituted $C_{6-13}$ cyclic aromatic hydrocarbons, substituted $C_{6-13}$ linear hydrocarbons, substituted $C_{6-13}$ branched hydrocarbons, non-substituted $C_{6-13}$ linear hydrocarbons, and non-substituted $C_{6-13}$ branched hydrocarbons, wherein a is 0 or 1, and wherein X is selected from the group consisting of $-O-$, $-S-$, $-CH_2-$ and

and wherein D is oxygen or

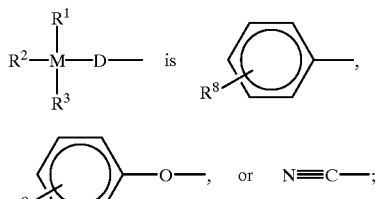

wherein $R^4$, $R^5$, $R^8$, $R^9$, and $R^{10}$ are the same or different and are each independently selected from the group consisting of H, halogens, $-NO_2$, $-OR$, R, and $-OH$;

wherein $R^1$, $R^2$, and $R^3$ are the same or different and are each independently selected from the group consisting of H, $-OR$, and R; and wherein each R is independently selected from the monovalent groups consisting of:

$C_{1-13}$ substituted linear hydrocarbons, $C_{1-13}$ non-substituted linear hydrocarbons, $C_{1-13}$ substituted branched hydrocarbons, $C_{1-13}$ non-substituted branched hydrocarbons, $C_{3-13}$ substituted cyclic hydrocarbons, $C_{3-13}$ non-substituted cyclic hydrocarbons, $C_{6-13}$ substituted cyclic aromatic hydrocarbons, $C_{6-13}$ non-substituted cyclic aromatic hydrocarbons, $C_{6-13}$ substituted cyclic aromatic hydrocarbons containing heteroatoms, and $C_{6-13}$ non-substituted cyclic aromatic hydrocarbons containing heteroatoms;

(b) separating the functionalized polymer from the reaction medium by precipitating the functionalized polymer;

(c) storing the functionalized polymer for up to about one week; and (d) then, after step (c), dissolving the functionalized polymer in a monomer or a mixture of monomers to initiate polymerization of the monomer or the mixture of monomers with the functionalized polymer to yield the copolymer or terpolymer.

26. A method for preparing a copolymer or terpolymer, the method comprising:

(a) preparing a functionalized polymer by a reacting a polymer with a free radical of formula A to yield the functionalized polymer in a reaction medium, wherein the functionalized polymer has a thermodissociable bond between the polymer and the free radical of formula A, and wherein formula A is

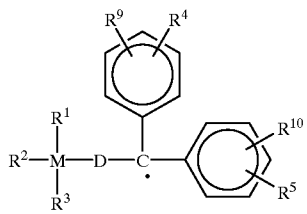

Formula A wherein $R^1$, $R^2$, and $R^3$ are the same or different and are each independently selected from the group consisting of R;

wherein M is a silicon or germanium atom;

wherein

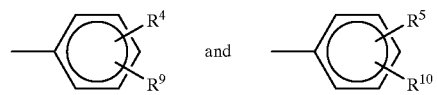

are the same or different radicals which are each independently selected from among aromatic cyclic hydrocarbons, wherein the aromatic cyclic hydrocarbons may contain one or more heteroatoms in ortho, meta, and/or para positions and/or may have one or more substituents at the ortho, meta, and/or para positions with the substituents being selected from the group consisting of halogens, $-NO_2$, $-OR$, R, and $-OH$, and wherein when the phenyl moieties of the radicals

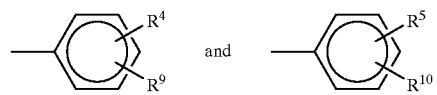

are directly linked to the same carbon atom, the radicals

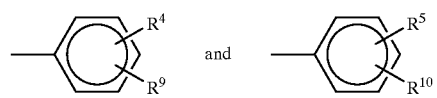

may form divalent diaryl groups selected from among:

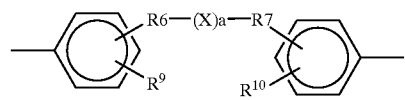

wherein $R^6$ and $R^7$ are the same or different and are each independently selected from the group consisting of multivalent substituted $C_{6-13}$ cyclic aromatic hydrocarbons, non-substituted $C_{6-13}$ cyclic aromatic hydrocarbons, substituted $C_{6-13}$ linear hydrocarbons, substituted $C_{6-13}$ branched hydrocarbons, non-substituted $C_{6-13}$ linear hydrocarbons, and non-substituted $C_{6-13}$ branched hydrocarbons, wherein a is 0 or 1, and wherein X is selected from the group consisting of $-O-$, $-S-$, $-CH_2-$ and

and wherein D is oxygen or

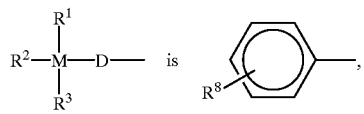 is 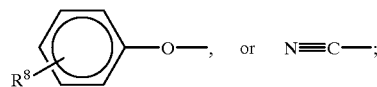, wherein $R^4$, $R^5$, $R^8$, $R^9$, and $R^{10}$ are the same or different and are each independently selected from the group consisting of H, halogens, $-NO_2$, $-OR$, R, and $-OH$;

wherein $R^1$, $R^2$, and $R^3$ are the same or different and are each independently selected from the group consisting of H, $-OR$, and R; and wherein each R is independently selected from the monovalent groups consisting of:

$C_{1-13}$ substituted linear hydrocarbons, $C_{1-13}$ non-substituted linear hydrocarbons, $C_{1-13}$ substituted branched hydrocarbons, $C_{1-13}$ non-substituted branched hydrocarbons, $C_{3-13}$ substituted cyclic hydrocarbons, $C_{3-13}$ non-substituted cyclic hydrocarbons, $C_{6-13}$ substituted cyclic aromatic hydrocarbons, $C_{6-13}$ non-substituted cyclic aromatic hydrocarbons, $C_{6-13}$ substituted cyclic aromatic hydrocarbons containing heteroatoms, and $C_{6-13}$ non-substituted cyclic aromatic hydrocarbons containing heteroatoms;

(b) separating the functionalized polymer from the reaction medium by precipitating the functionalized polymer;

(c) storing the functionalized polymer for more than about one week; and (d) then, after step (c), dissolving the functionalized polymer in a monomer or a mixture of monomers to initiate polymerization of the monomer or the mixture of monomers with the functionalized polymer to yield the copolymer or terpolymer.

27. A method for preparing a copolymer or terpolymer, the method comprising:

(a) providing a functionalized polymer, wherein the functionalized polymer was prepared by a reacting a polymer with a free radical of formula A to yield the functionalized polymer, wherein the functionalized polymer has a thermodissociable bond between the polymer and the free radical of formula A, and wherein formula A is Formula A

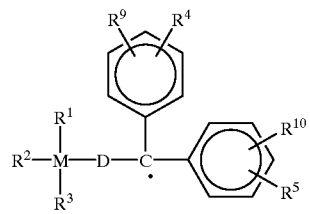

wherein $R^1$, $R^2$, and $R^3$ are the same or different and are each independently selected from the group consisting of R;

wherein M is a silicon or germanium atom;

wherein

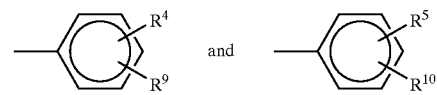

are the same or different radicals which are each independently selected from among aromatic cyclic hydrocarbons, wherein the aromatic cyclic hydrocarbons may contain one or more heteroatoms in ortho, meta, and/or para positions and/or may have one or more substituents at the ortho, meta, and/or para positions with the substituents being selected from the group consisting of halogens, $-NO_2$, $-OR$, R, and $-OH$, and wherein when the phenyl moieties of the radicals

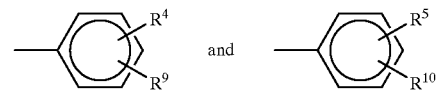

are directly linked to the same carbon atom, the radicals

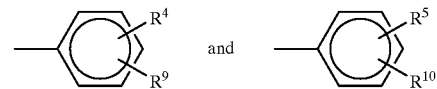

may form divalent diaryl groups selected from among:

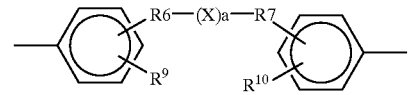

wherein $R^6$ and $R^7$ are the same or different and are each independently selected from the group consisting of multivalent substituted $C_{6-13}$ cyclic aromatic hydrocarbons, non-substituted $C_{6-13}$ cyclic aromatic hydrocarbons, substituted $C_{6-13}$ linear hydrocarbons, substituted $C_{6-13}$ branched hydrocarbons, non-substituted $C_{6-13}$ linear hydrocarbons, and non-substituted $C_{6-13}$ branched hydrocarbons, wherein a is 0 or 1, and wherein X is selected from the group consisting of $-O-$, $-S-$, $-CH_2-$ and

and wherein D is oxygen or

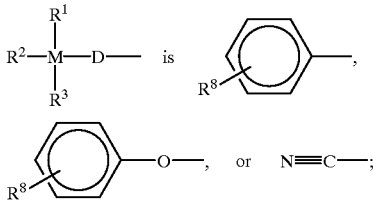

wherein $R^4$, $R^5$, $R^8$, $R^9$, and $R^{10}$ are the same or different and are each independently selected from the group consisting of H, halogens, —$NO_2$, —OR, R, and —OH;

wherein $R^1$, $R^2$, and $R^3$ are the same or different and are each independently selected from the group consisting of H, —OR, and R; and wherein each R is independently selected from the monovalent groups consisting of:
$C_{1-13}$ substituted linear hydrocarbons,
$C_{1-13}$ non-substituted linear hydrocarbons,
$C_{1-13}$ substituted branched hydrocarbons,
$C_{1-13}$ non-substituted branched hydrocarbons,
$C_{3-13}$ substituted cyclic hydrocarbons,
$C_{3-13}$ non-substituted cyclic hydrocarbons,
$C_{6-13}$ substituted cyclic aromatic hydrocarbons,
$C_{6-13}$ non-substituted cyclic aromatic hydrocarbons,
$C_{6-13}$ substituted cyclic aromatic hydrocarbons containing heteroatoms, and
$C_{6-13}$ non-substituted cyclic aromatic hydrocarbons containing heteroatoms; and (b) initiating polymerization of a monomer or a mixture of monomers with the functionalized polymer to yield the copolymer or terpolymer.

28. A method for functionalizing a polymer as claimed in claim 1, wherein M is germanium; or wherein

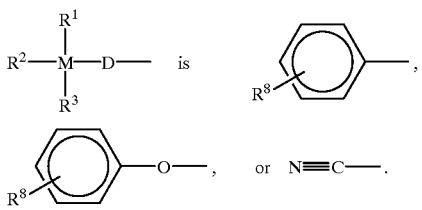

29. A method for functionalizing a polymer as claimed in claim 1, wherein the substituted $C_6$–$C_{13}$ linear hydrocarbons are aliphatic groups; wherein the substituted $C_6$–$C_{13}$ branched hydrocarbons are aliphatic groups; wherein the non-substituted $C_6$–$C_{13}$ linear hydrocarbons are aliphatic groups; and wherein the non-substituted $C_6$–$C_{13}$ branched hydrocarbons are aliphatic groups.

30. A method for functionalizing a polymer as claimed in claim 17, wherein the substituted $C_6$–$C_{13}$ linear hydrocarbons are aliphatic groups; wherein the substituted $C_6$–$C_{13}$ branched hydrocarbons are aliphatic groups; wherein the non-substituted $C_6$–$C_{13}$ linear hydrocarbons are aliphatic groups; and wherein the non-substituted $C_6$–$C_{13}$ branched hydrocarbons are aliphatic groups.

31. A method for functionalizing a polymer as claimed in claim 18, wherein the substituted $C_6$–$C_{13}$ linear hydrocarbons are aliphatic groups; wherein the substituted $C_6$–$C_{13}$ branched hydrocarbons are aliphatic groups; wherein the non-substituted $C_6$–$C_{13}$ linear hydrocarbons are aliphatic groups; and wherein the non-substituted $C_6$–$C_{13}$ branched hydrocarbons are aliphatic groups.

32. A method as claimed in claim 17, wherein the polymer is linear, branched, saturated, or unsaturated.

33. A method as claimed in claim 32, wherein the polymer is an elastomer, a thermoplastic, a thermoset, or mixtures thereof.

34. A method as claimed in claim 33, wherein the polymer has labile substituents, the substituents being selected from the group consisting of H, protons belonging to chemical groups, and halogens.

35. A method as claimed in claim 34, wherein the polymer is saturated or unsaturated, wherein the polymer is selected from the group consisting of polybutadiene, butadiene copolymers and terpolymers, polyisoprene, copolymers and terpolymers of isoprene, ethylene-propylene-diene monomers and terpolymers (EPDM), polychloroprene, copolymers and terpolymers of chloroprene, polyvinyl chloride, copolymers and terpolymers of vinyl chloride, natural rubber regardless of its origin, alkyl methacrylates, alkyl polyacrylates, polyacetylenes, poly(acrylonitrile), poly(vinylacetate), polyesters, polyamides, and polymers from butadiene, isoprene, chloroprene, EPDM, and mixtures thereof.

36. A method as claimed in claim 17, wherein the free radical is generated from a dimer of the free radical of formula A.

37. A method as claimed in claim 32, wherein the free radical is generated from a dimer of the free radical of formula A.

38. A method as claimed in claim 32, wherein the free radical is selected from the group consisting of substituted diphenylacetonitryl, unsubstituted diphenylacetonitryl, substituted diphenylphenyloxymethyl, unsubstituted diphenylphenyloxymethyl, substituted triphenylmethyl, unsubstituted triphenylmethyl, substituted diphenyltrialkylgermaniumyloxymethyl, unsubstituted diphenyltrialkylgermaniumyloxymethyl, substituted diphenyltrialkylsilyloxymethyl, and unsubstituted diphenyltrialkylsilyloxymethyl.

39. A method as claimed in claim 32, wherein the free radical is generated from a free radical generator selected from the group consisting of substituted tetrephenylethanes; 1,1,2,2-tetraphenyl-bis(trimethylsilyloxy)ethane; 1,1,2,2-tetra (pentafluorophenyl)-bis(trimethylsilyloxy)ethane; 1,2-di-2 (fluorophenyl)-1,2-diphenyl-bis(trimethylsilyloxy) ethane; 1,1,2,2-tetra(4-fluorophenyl)-bis(trimethylsilyloxy) ethane; oligo[1,1,2,2-tetraphenyl-bis(trimethylsilyloxy) ethane]; dimethyl-bis (diphenylmethoxy)silane; bis (fluorenyltrimethylsilyloxy); 1,2-di(4-methylphenyl)-1,2-diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis (dimethylphenylsilyloxy)ethane; 1,2-di(2-pyridyl)-1,2-bis(trimethylsilyloxy)ethane; bis(benzanthronetrimethylsilyloxy); bis (xanthonetrimethylsilyloxy); and mixtures thereof.

40. A method as claimed in claim 36, wherein the dimer is selected from the group consisting of substituted tetraphenylethanes; and wherein the polymer is selected from the group consisting of polybutadienes with any microstructure, copolymers and terpolymers based on butadiene with any topology and with any molar amount of monomers comprising the copolymers and terpolymers, ethylene-propylene-diene monomers and terpolymers with any topology and with any molar amount of monomers comprising the terpolymers, polyisoprene and its copolymers with any topology and with any molar amount of monomers comprising the copolymers, polychloroprenes and copolymers of chloroprene with any topology with any molar amount of monomers comprising the copolymers, polyvinyl chlorides and copolymers of vinyl chlorides, natural rubber regardless of its origin, alkyl polymethacrylates, alkyl polyacrylates, polyacetylenes, polyacrylonitriles, polyvinyl acetate, and mixtures thereof.

41. A functionalized polymer prepared according to the method claimed in claim 17.

42. A functionalized polymer prepared according to the method claimed in claim 35.

43. A functionalized polymer prepared according to the method claimed in claim 38.

44. A functionalized polymer prepared according to the method claimed in claim 39.

45. A method as claimed in claim 18, wherein the polymer is linear, branched, saturated, or unsaturated.

46. A method as claimed in claim 45, wherein the polymer is an elastomer, a thermoplastic, a thermoset, or mixtures thereof.

47. A method as claimed in claim 46, wherein the polymer has labile substituents, the substituents being selected from the group consisting of H, protons belonging to chemical groups, and halogens.

48. A method as claimed in claim 47, wherein the polymer is saturated or unsaturated, wherein the polymer is selected from the group consisting of polybutadiene, butadiene copolymers and terpolymers, polyisoprene, copolymers and terpolymers of isoprene, ethylene-propylene-diene monomers and terpolymers (EPDM), polychloroprene, copolymers and terpolymers of chloroprene, polyvinyl chloride, copolymers and terpolymers of vinyl chloride, natural rubber regardless of its origin, alkyl methacrylates, alkyl polyacrylates, polyacetylenes, poly(acrylonitrile), poly (vinylacetate), polyesters, polyamides, and polymers from butadiene, isoprene, chloroprene, EPDM, and mixtures thereof.

49. A method as claimed in claim 18, wherein the free radical is generated from a dimer of the free radical of formula A.

50. A method as claimed in claim 45, wherein the free radical is generated from a dimer of the free radical of formula A.

51. A method as claimed in claim 45, wherein the free radical is selected from the group consisting of substituted diphenylacetonitryl, unsubstituted diphenylacetonitryl, substituted diphenylphenyloxymethyl, unsubstituted diphenylphenyloxymethyl, substituted triphenylmethyl, unsubstituted triphenylmethyl, substituted diphenyltrialkylgermaniumyloxymethyl, unsubstituted diphenyltrialkylgermaniumyloxymethyl, substituted diphenyltrialkylsilyloxymethyl, and unsubstituted diphenyltrialkylsilyloxymethyl.

52. A method as claimed in claim 45, wherein the free radical is generated from a free radical generator selected from the group consisting of substituted tetrephenylethanes; 1,1,2,2-tetraphenyl-bis(trimethylsilyloxy)ethane; 1,1,2,2-tetra (pentafluorophenyl)-bis(trimethylsilyloxy)ethane; 1,2-di-2 (fluorophenyl)-1,2-diphenyl-bis(trimethylsilyloxy) ethane; 1,1,2,2-tetra(4-fluorophenyl)-bis(trimethylsilyloxy) ethane; oligo[1,1,2,2-tetraphenyl-bis(trimethylsilyloxy) ethane]; dimethyl-bis (diphenylmethoxy)silane; bis (fluorenyltrimethylsilyloxy); 1,2-di(4-methylphenyl)-1,2-diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis (dimethylphenylsilyloxy)ethane; 1,2-di(2-pyridyl)-1,2-bis (trimethylsilyloxy)ethane; bis (benzanthronetrimethylsilyloxy); bis (xanthonetrimethylsilyloxy); and mixtures thereof.

53. A method as claimed in claim 49, wherein the dimer is selected from the group consisting of substituted tetraphenylethanes; and wherein the polymer is selected from the group consisting of polybutadienes with any microstructure, copolymers and terpolymers based on butadiene with any topology and with any molar amount of monomers comprising the copolymers and terpolymers, ethylene-propylene-diene monomers and terpolymers with any topology and with any molar amount of monomers comprising the terpolymers, polyisoprene and its copolymers with any topology and with any molar amount of monomers comprising the copolymers, polychloroprenes and copolymers of chloroprene with any topology with any molar amount of monomers comprising the copolymers, polyvinyl chlorides and copolymers of vinyl chlorides, natural rubber regardless of its origin, alkyl polymethacrylates, alkyl polyacrylates, polyacetylenes, polyacrylonitriles, polyvinyl acetate, and mixtures thereof.

54. A functionalized polymer prepared according to the method claimed in claim 18.

55. A functionalized polymer prepared according to the method claimed in claim 48.

56. A functionalized polymer prepared according to the method claimed in claim 51.

57. A functionalized polymer prepared according to the method claimed in claim 52.

58. A method as claimed in claim 19, wherein the monomer is selected from the group consisting of vinyl monomers, olefin monomers, diene monomers, condensation monomers, and mixtures thereof.

59. A method as claimed in claim 19, wherein the monomer is selected from the group consisting of styrene monomers, acrylic monomers, diene monomers, olefin monomers, methacrylic monomers, and mixtures thereof.

60. A copolymer or terpolymer prepared according to the method claimed in claim 19.

61. A method as claimed in claim 19, wherein a copolymer is prepared, and wherein the copolymer comprises a nanocomposite.

62. A nanocomposite prepared according to the method claimed in claim 61.

63. A method as claimed in claim 19, wherein a grafted copolymer is prepared.

64. A grafted copolymer prepared according to the method claimed in claim 63.

65. A method as claimed in claim 19, wherein the monomer is selected from a group consisting of styrene, methyl methacrylate, ethyl methacrylate, all isomers of propylmethacrylate, all isomers of butyl methacrylate, 2-ethylhexyl methacrylate, isobornyl methacrylate, methacrylic acid, benzyl methacrylate, phenyl methacrylate, methacrylonitrile, alpha-methylstyrene, methylacrylate, ethyl acrylate, all isomers of propyl acrylate, all isomers of butyl acrylate, 2-ethylhexyl acrylate, isobornyl acrylate, acrylic acid, benzyl acrylate, phenyl acrylate, acrilonitrile, functional methacrylates, acrylates and stryenes selected from glycidyl methacrylate, 2-hydroxyethyl methacrylate, all isomers of hydroxypropyl methacrylate, all isomers of hydroxybutyl methacrylate, N-N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, all isomers of hydroxypropyl acrylate, all isomers of hyroxybutyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, n-ethylolmethacrylamide, N-tert-butylacrylamide, N-n-butylacrylamide, n-methylolacrylamide, N-ethylolacrylamide, all isomers of vinyl benzoic acid, all isomers of diethylaminostyrene, all isomers of alpha-methylvinyl benzoic acid, all isomers of diethylamino alpha-methylstyrene, p-vinylbenzene sulfonic acid, p-p-vinylbenzene sulfonic acid sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropylmethoxysilylpropyl methacrylate, dimethoxysilylpropyl methacrylate, diethoxysilylpropyl methacrylate, dibutoxysilylpropyl methacrylate, diisopropoxylsilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilypropyl acrylate, dibutoxymethylsilylpropyl acrylate, diisopropylmethoxysilylpropyl acrylate, dimethoxysilylpropyl acrylate, diethoxysilylpropyl acrylate, dibutoxysilylpropylacrylate, diisopropoxylsilylpropyl acrylate, vinyl acetate, vinyl butyrate, vinylbenzoate, vinyl chloride, vinyl fluoride, vinyl bromide, maleic anhydride, N-phenylmaleimide, N-vinylpyrrolidone, N-vinylcarbazole, p-amino styrene, butadiene, isoprene, chloroprene, ethylene, propylene, and mixtures thereof.

66. A method as claimed in claim 19, wherein the free radical is selected from the group consisting of substituted diphenylacetonitryl, unsubstituted diphenylacetonitryl, substitued diphenylphenyloxymethyl, unsubstituted diphenylphenyloxymethyl, substituted triphenylmethyl, unsubstituted triphenylmethyl, substituted diphenyltrialkylgermaniumyloxymethyl, unsubstituted diphenyltrialkylgermaniumyloxymethyl, substituted diphenyltrialkylsilyloxymethyl, and unsubstituted diphenyltrialkylsilyloxymethyl.

67. A method as claimed in claim 19, wherein the free radical is generated from a free radical generator selected from the group consisting of substituted tetrephenylethanes; 1,1,2,2-tetraphenyl-bis(trimethylsilyloxy)ethane; 1,1,2,2-tetra (pentafluorophenyl)-bis(trimethylsilyloxy)ethane; 1,2-di-2 (fluorophenyl)-1,2-diphenyl-bis(trimethylsilyloxy) ethane; 1,1,2,2-tetra(4-fluorophenyl)-bis(trimethylsilyloxy) ethane; oligo[1,1,2,2-tetraphenyl-bis(trimethylsilyloxy) ethane]; dimethyl-bis (diphenylmethoxy)silane; bis (fluorenyltrimethylsilyloxy); 1,2-di(4-methylphenyl)-1,2-diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis (dimethylphenylsilyloxy)ethane; 1,2-di(2-pyridyl)-1,2-bis (trimethylsilyloxy)ethane; bis (benzanthronetrimethylsilyloxy); bis (xanthonetrimethylsilyloxy); and mixtures thereof.

68. A method as claimed in claim 20, wherein the monomer is selected from the group consisting of vinyl monomers, olefin monomers, diene monomers, condensation monomers, and mixtures thereof.

69. A method as claimed in claim 20, wherein the monomer is selected from the group consisting of styrene monomers, acrylic monomers, diene monomers, olefin monomers, methacrylic monomers, and mixtures thereof.

70. A copolymer or terpolymer prepared according to the method claimed in claim 20.

71. A method as claimed in claim 20, wherein a copolymer is prepared, and wherein the copolymer comprises a nanocomposite.

72. A nanocomposite prepared according to the method claimed in claim 71.

73. A method as claimed in claim 20, wherein a grafted copolymer is prepared.

74. A grafted copolymer prepared according to the method claimed in claim 73.

75. A method as claimed in claim 20, wherein the monomer is selected from a group consisting of styrene, methyl methacrylate, ethyl methacrylate, all isomers of propylmethacrylate, all isomers of butyl methacrylate, 2-ethylhexyl methacrylate, isobornyl methacrylate, methacrylic acid, benzyl methacrylate, phenyl methacrylate, methacrylonitrile, alpha-methylstyrene, methylacrylate, ethyl acrylate, all isomers of propyl acrylate, all isomers of butyl acrylate, 2-ethylhexyl acrylate, isobornyl acrylate, acrylic acid, benzyl acrylate, phenyl acrylate, acrilonitrile, functional methacrylates, acrylates and stryenes selected from glycidyl methacrylate, 2-hydroxyethyl methacrylate, all isomers of hydroxypropyl methacrylate, all isomers of hydroxybutyl methacrylate, N-N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, all isomers of hydroxypropyl acrylate, all isomers of hyroxybutyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, n-ethylolmethacrylamide, N-tert-butylacrylamide, N-n-butylacrylamide, n-methylolacrylamide, N-ethylolacrylamide, all isomers of vinyl benzoic acid, all isomers of diethylaminostyrene, all isomers of alpha-methylvinyl benzoic acid, all isomers of diethylamino alpha-methylstyrene, p-vinylbenzene sulfonic acid, p-p-vinylbenzene sulfonic acid sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropylmethoxysilylpropyl methacrylate, dimethoxysilylpropyl methacrylate, diethoxysilylpropyl methacrylate, dibutoxysilylpropyl methacrylate, diisopropoxylsilylpropyl methacrylate, trimethoxysilylpropyl acrylate, triethoxysilylpropyl acrylate, tributoxysilylprQpyl acrylate, dimethoxymethylsilylpropyl acrylate, diethoxymethylsilypropyl acrylate, dibutoxymethylsilylpropyl acrylate, diisopropylmethoxysilylpropyl acrylate, dimethoxysilylpropyl acrylate, diethoxysilylpropyl acrylate, dibutoxysilylpropylacrylate, diisopropoxylsilylpropyl acrylate, vinyl acetate, vinyl butyrate, vinylbenzoate, vinyl chloride, vinyl fluoride, vinyl bromide, maleic anhydride, N-phenylmaleimide, N-vinylpyrrolidone, N-vinylcarbazole, p-amino styrene, butadiene, isoprene, chloroprene, ethylene, propylene, and mixtures thereof.

76. A method as claimed in claim 20, wherein the free radical is selected from the group consisting of substituted diphenylacetonitryl, unsubstituted diphenylacetonitryl, substituted diphenylphenyloxymethyl, unsubstituted diphenylphenyloxymethyl, substituted triphenylmethyl, unsubstituted triphenylmethyl, substituted diphenyltrialkylgermaniumyloxymethyl, unsubstituted diphenyltrialkylgermaniumyloxymethyl, substituted diphenyltrialkylsilyloxymethyl, and unsubstituted diphenyltrialkylsilyloxymethyl.

77. A method as claimed in claim 20, wherein the free radical is generated from a free radical generator selected from the group consisting of substituted tetrephenylethanes; 1,1,2,2-tetraphenyl-bis(trimethylsilyloxy)ethane; 1,1,2,2-tetra (pentafluorophenyl)-bis(trimethylsilyloxy)ethane; 1,2-di-2 (fluorophenyl)-1,2-diphenyl-bis(trimethylsilyloxy) ethane; 1,1,2,2-tetra(4-fluorophenyl)-bis(trimethylsilyloxy) ethane; oligo[1,1,2,2-tetraphenyl-bis(trimethylsilyloxy) ethane]; dimethyl-bis (diphenylmethoxy)silane; bis (fluorenyltrimethylsilyloxy); 1,2-di(4-methylphenyl)-1,2-diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis (dimethylphenylsilyloxy)ethane; 1,2-di(2-pyridyl)-1,2-bis (trimethylsilyloxy)ethane; bis (benzanthronetrimethylsilyloxy); bis (xanthonetrimethylsilyloxy); and mixtures thereof.

78. A method as claimed in claim 27, wherein the monomer is selected from the group consisting of vinyl monomers, olefin monomers, diene monomers, condensation monomers, and mixtures thereof.

79. A method as claimed in claim 27, wherein the monomer is selected from the group consisting of styrene monomers, acrylic monomers, diene monomers, olefin monomers, methacrylic monomers, and mixtures thereof.

80. A copolymer or terpolymer prepared according to the method claimed in claim 27.

81. A method as claimed in claim 27, wherein a copolymer is prepared, and wherein the copolymer comprises a nanocomposite.

82. A nanocomposite prepared according to the method claimed in claim 81.

83. A method as claimed in claim 27, wherein a grafted copolymer is prepared.

84. A grafted copolymer prepared according to the method claimed in claim 83.

85. A method as claimed in claim 27, wherein the monomer is selected from a group consisting of styrene, methyl methacrylate, ethyl methacrylate, all isomers of propylmethacrylate, all isomers of butyl methacrylate, 2-ethylhexyl methacrylate, isobornyl methacrylate, methacrylic acid, benzyl methacrylate, phenyl methacrylate, methacrylonitrile, alpha-methylstyrene, methylacrylate, ethyl acrylate, all isomers of propyl acrylate, all isomers of butyl acrylate, 2-ethylhexyl acrylate, isobornyl acrylate, acrylic acid, benzyl acrylate, phenyl acrylate, acrilonitrile, functional methacrylates, acrylates and stryenes selected from glycidyl methacrylate, 2-hydroxyethyl methacrylate, all isomers of hydroxypropyl methacrylate, all isomers of hydroxybutyl methacrylate, N-N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, all isomers of hydroxypropyl acrylate, all isomers of hyroxybutyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, n-ethylolmethacrylamide, N-tert-butylacrylamide, N-n-butylacrylamide, n-methylolacrylamide, N-ethylolacrylamide, all isomers of vinyl benzoic acid, all isomers of diethylaminostyrene, all isomers of alpha-methylvinyl benzoic acid, all isomers of diethylamino alpha-methylstyrene, p-vinylbenzene sulfonic acid, p-p-vinylbenzene sulfonic acid sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropylmethoxysilylpropyl methacrylate, dimethoxysilylpropyl methacrylate, diethoxysilylpropyl methacrylate, dibutoxysilylpropyl methacrylate, diisopropoxylsilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilypropyl acrylate, dibutoxymethylsilylpropyl acrylate, diisopropylmethoxysilylpropyl acrylate, dimethoxysilylpropyl acrylate, diethoxysilylpropyl acrylate, dibutoxysilylpropylacrylate, diisopropoxylsilylpropyl acrylate, vinyl acetate, vinyl butyrate, vinylbenzoate, vinyl chloride, vinyl fluoride, vinyl bromide, maleic anhydride, N-phenylmaleimide, N-vinylpyrrolidone, N-vinylcarbazole, p-amino styrene, butadiene, isoprene, chloroprene, ethylene, propylene, and mixtures thereof.

86. A method as claimed in claim 27, wherein the free radical is selected from the group consisting of substituted diphenylacetonitryl, unsubstituted diphenylacetonitryl, substituted diphenylphenyloxymethyl, unsubstituted diphenylphenyloxymethyl, substituted triphenylmethyl, unsubstituted triphenylmethyl, substituted diphenyltrialkylgermaniumyloxymethyl, unsubstituted diphenyltrialkylgermaniumyloxymethyl, substituted diphenyltrialkylsilyloxymethyl, and unsubstituted diphenyltrialkylsilyloxymethyl.

87. A method as claimed in claim 27, wherein the free radical is generated from a free radical generator selected from the group consisting of substituted tetrephenylethanes; 1,1,2,2-tetraphenyl-bis(trimethylsilyloxy)ethane; 1,1,2,2-tetra (pentafluorophenyl)-bis(trimethylsilyloxy)ethane; 1,2-di-2 (fluorophenyl)-1,2-diphenyl-bis(trimethylsilyloxy) ethane; 1,1,2,2-tetran(4-fluorophenyl)-bis (trimethylsilyloxy)ethane; oligo[1,1,2,2-tetraphenyl-bis (trimethylsilyloxy)ethane]; diethyl-bis (diphenylmethoxy) silane; bis(fluorenyltrimethylsilyloxy); 1,2-di(4-methylphenyl)-1,2diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis (dimethylphenylsilyloxy)ethane; 1,2-di(2-pyridyl)-1,2-bis (trimethylsilyloxy)ethane; bis (benzanthronetrimethylsilyloxy); bis (xanthonetrimethylsilyloxy); and mixtures thereof.

88. A method as claimed in claim 22, wherein the free radical is selected from the group consisting of substituted diphenylacetonitryl, unsubstituted diphenylacetonitryl, substituted diphenylphenyloxymethyl, unsubstituted diphenylphenyloxymethyl, substituted triphenylmethyl, unsubstituted triphenylmethyl, substituted diphenyltrialkylgermaniuryloxymethyl, unsubstituted diphenyltrialkylgermaniumyloxymethyl, substituted diphenyltrialkylsilyloxymethyl, and unsubstituted diphenyltrialkylsilyloxymethyl.

89. A method as claimed in claim 22, wherein the free radical is generated from a free radical generator selected from the group consisting of substituted tetrephenylethanes; 1,1,2,2-tetraphenyl-bis(trimethylsilyloxy)ethane; 1,1,2,2-tetra (pentafluorophenyl)-bis(trimethylsilyloxy)ethane; 1,2-di-2 (fluorophenyl)-1,2-diphenyl-bis(trimethylsilyloxy) ethane; 1,1,2,2-tetra(4-fluorophenyl)-bis(trimethylsilyloxy) ethane; oligo[1,1,2,2-tetraphenyl-bis(trimethylsilyloxy) ethane]; dimethyl-bis (diphenylmethoxy)silane; bis (fluorenyltrimethylsilyloxy); 1,2-di(4-methylphenyl)-1,2-diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis (dimethylphenylsilyloxy)ethane; 1,2-di(2-pyridyl)-1,2-bis (trimethylsilyloxy)ethane; bis (benzanthronetrimethylsilyloxy); bis (xanthonetrimethylsilyloxy); and mixtures thereof.

90. A method as claimed in claim 23, wherein the free radical is selected from the group consisting of substituted diphenylacetonitryl, unsubstituted diphenylacetonitryl, substituted diphenylphenyloxymethyl, unsubstituted diphenylphenyloxymethyl, substituted triphenylmethyl, unsubstituted triphenylmethyl, substituted diphenyltrialkylgermaniumyloxymethyl, unsubstituted diphenyltrialkylgermaniumyloxymethyl, substituted diphenyltrialkylsilyloxymethyl, and unsubstituted diphenyltrialkylsilyloxymethyl.

91. A method as claimed in claim 23, wherein the free radical is generated from a free radical generator selected from the group consisting of substituted tetrephenylethanes; 1,1,2,2-tetraphenyl-bis(trimethylsilyloxy)ethane; 1,1,2,2-tetra (pentafluorophenyl)-bis(trimethylsilyloxy)ethane; 1,2-di-2 (fluorophenyl)-1,2-diphenyl-bis(trimethylsilyloxy) ethane; 1,1,2,2-tetra(4-fluorophenyl)-bis(trimethylsilyloxy) ethane; oligo[1,1,2,2-tetraphenyl-bis(trimethylsilyloxy) ethane]; dimethyl-bis (diphenylmethoxy)silane; bis (fluorenyltrimethylsilyloxy); 1,2-di(4-methylphenyl)-1,2-diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis (dimethylphenylsilyloxy)ethane; 1,2-di(2-pyridyl)-1,2-bis (trimethylsilyloxy)ethane; bis (benzanthronetrimethylsilyloxy); bis (xanthonetrimethylsilyloxy); and mixtures thereof.

92. A method as claimed in claim 26, wherein the free radical is selected from the group consisting of substituted diphenylacetonitryl, unsubstituted diphenylacetonitryl, substituted diphenylphenyloxymethyl, unsubstituted diphenylphenyloxymethyl, substituted triphenylmethyl, unsubstituted triphenylmethyl, substituted diphenyltrialkylgermaniumyloxymethyl, unsubstituted diphenyltrialkylgermaniumyloxymethyl, substituted diphenyltrialkylsilyloxymethyl, and unsubstituted diphenyltrialkylsilyloxymethyl.

93. A method as claimed in claim 26, wherein the free radical is generated from a free radical generator selected from the group consisting of substituted tetrephenylethanes; 1,1,2,2-tetraphenyl-bis(trimethylsilyloxy)ethane; 1,1,2,2-tetra (pentafluorophenyl)-bis(trimethylsilyloxy)ethane; 1,2-di-2 (fluorophenyl)-1,2-diphenyl-bis(trimethylsilyloxy) ethane; 1,1,2,2-tetra(4-fluorophenyl)-bis(trimethylsilyloxy) ethane; oligo[1,1,2,2-tetraphenyl-bis(trimethylsilyloxy) ethane]; dimethyl-bis (diphenylmethoxy)silane; bis (fluorenyltrimethylsilyloxy); 1,2-di(4-methylphenyl)-1,2-diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis (dimethylphenylsilyloxy)ethane; 1,2-di(2-pyridyl)-1,2-bis (trimethylsilyloxy)ethane; bis (benzanthronetrimethylsilyloxy); bis (xanthonetrimethylsilyloxy); and mixtures thereof.

94. A method as claimed in claim 26, wherein the free radical is selected from the group consisting of substituted diphenylacetonitryl, unsubstituted diphenylacetonitryl, substituted diphenylphenyloxymethyl, unsubstituted diphenylphenyloxymethyl, substituted triphenylmethyl, unsubstituted triphenylmethyl, substituted diphenyltrialkylgermaniumyloxymethyl, unsubstituted diphenyltrialkylgermaniumyloxymethyl, substituted diphenyltrialkylsilyloxymethyl, and unsubstituted diphenyltrialkylsilyloxymethyl.

95. A method as claimed in claim 26, wherein the free radical is generated from a free radical generator selected from the group consisting of substituted tetrephenylethanes; 1,1,2,2-tetraphenyl-bis(trimethylsilyloxy)ethane; 1,1,2,2-tetra (pentafluorophenyl)-bis(trimethylsilyloxy)ethane; 1,2-di-2 (fluorophenyl)-1,2-diphenyl-bis(trimethylsilyloxy) ethane; 1,1,2,2-tetra(4-fluorophenyl)-bis(trimethylsilyloxy) ethane; oligo[1,1,2,2-tetraphenyl-bis(trimethylsilyloxy) ethane]; dimethyl-bis (diphenylmethoxy)silane; bis (fluorenyltrimethylsilyloxy); 1,2-di(4-methylphenyl)-1,2-diphenyl-bis(trimethylsilyloxy)ethane; tetradiphenylmethoxysilane; 1,2-di(4-methoxyphenyl)-1,2-diphenyl-bis(trimethylsilyloxy)ethane; 1,1,2,2-tetraphenyl-bis (dimethylphenylsilyloxy)ethane; 1,2-di(2-pyridyl)-1,2-bis (trimethylsilyloxy)ethane; bis (benzanthronetrimethylsilyloxy); bis (xanthonetrimethylsilyloxy); and mixtures thereof.

96. A method as claimed in claim 34, wherein the polymer is selected from a group consisting of polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes, and mixtures thereof.

97. A method as claimed in claim 47, wherein the polymer is selected from a group consisting of polybutadiene, copolymers and terpolymers of butadiene, polyisoprene, copolymers and terpolymers of isoprene, ethylene-propylene-diene terpolymers, polychloroprene, copolymers and terpolymers of chloroprene, natural rubbers regardless of their origin, polyvinylchloride, copolymers and terpolymers of vinylchloride, polyalkylmethacrylates, copolymers and terpolymers of alkylmethacrylates, alkylacrylates, copolymers and terpolymers of alkylacrylates, polyacrylonitrile, copolymers and terpolymers of acrylonitrile, polyvinyl acetate, copolymers and terpolymers of vinylacetate, polyactetylenes, copolymers and terpolymers of acetylenes, polyesters, copolyesters, polyamides, copolyamides, polyacetales, polyurethanes, and mixtures thereof.

98. A method for functionalizing a polymer as claimed in claim 17, wherein M is germanium; or wherein

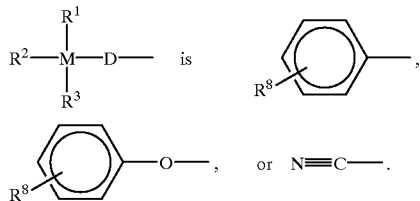

99. A method for functionalizing a polymer as claimed in claim 18, wherein M is germanium; or wherein

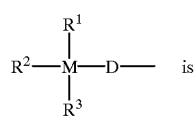 is 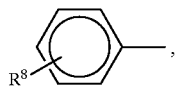, 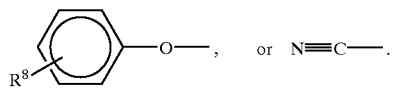
* * * * *